United States Patent
Ozawa et al.

(10) Patent No.: US 10,319,402 B2
(45) Date of Patent: *Jun. 11, 2019

(54) MAGNETIC TAPE HAVING CHARACTERIZED BACKCOAT LAYER AND METHOD OF MANUFACTURING THE SAME

(71) Applicant: FUJIFILM Corporation, Tokyo (JP)

(72) Inventors: Eiki Ozawa, Minami-ashigara (JP); Masahito Oyanagi, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,944

(22) Filed: Feb. 2, 2017

(65) Prior Publication Data

US 2017/0221517 A1    Aug. 3, 2017

(30) Foreign Application Priority Data

Feb. 3, 2016   (JP) .................................. 2016-018823

(51) Int. Cl.
| | | |
|---|---|---|
| *G11B 5/73* | (2006.01) | |
| *G11B 5/735* | (2006.01) | |
| *G11B 5/70* | (2006.01) | |
| *G11B 5/733* | (2006.01) | |
| *G11B 5/84* | (2006.01) | |
| *G11B 5/78* | (2006.01) | |

(52) U.S. Cl.
CPC .............. *G11B 5/735* (2013.01); *G11B 5/70* (2013.01); *G11B 5/733* (2013.01); *G11B 5/7305* (2013.01); *G11B 5/78* (2013.01); *G11B 5/8404* (2013.01); *G11B 5/8412* (2013.01)

(58) Field of Classification Search
None
See application file for complete search history.

(56) References Cited

U.S. PATENT DOCUMENTS

| | | |
|---|---|---|
| 3,966,686 A | 6/1976 | Asakura et al. |
| 4,112,187 A | 9/1978 | Asakura et al. |
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,689,384 A | 11/1997 | Albrecht et al. |
| 5,728,454 A | 3/1998 | Inaba et al. |
| 5,786,074 A | 7/1998 | Soui |
| 6,099,957 A | 8/2000 | Yamamoto et al. |
| 6,183,606 B1 | 2/2001 | Kuo et al. |
| 6,207,252 B1 * | 3/2001 | Shimomura ............. G11B 5/70 428/141 |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,461 B1 | 12/2004 | Yamagata et al. |
| 6,921,592 B2 | 7/2005 | Tani et al. |
| 6,939,606 B2 | 9/2005 | Hashimoto et al. |

(Continued)

FOREIGN PATENT DOCUMENTS

| | | |
|---|---|---|
| DE | 101 46 429 A1 | 3/2002 |
| GB | 2495356 A | 4/2013 |

(Continued)

OTHER PUBLICATIONS

An Office Action dated May 4, 2018, which issued during the prosecution of U.S. Appl. No. 15/625,428.
An Office Action dated May 7, 2018, which issued during the prosecution of U.S. Appl. No. 15/624,897.
An Office Action dated May 7, 2018, which issued during the prosecution of U.S. Appl. No. 15/624,792.
An Office Action dated May 7, 2018, which issued during the prosecution of U.S. Appl. No. 15/626,832.
An Office Action dated May 2, 2018, which issued during the prosecution of U.S. Appl. No. 15/280,195.
Notice of Allowance dated Aug. 30, 2017, which issued during the prosecution of U.S. Appl. No. 15/466,143.
An Office Action dated May 4, 2018, which issued during the prosecution of U.S. Appl. No. 15/422,821.

(Continued)

*Primary Examiner* — Kevin M Bernatz
(74) *Attorney, Agent, or Firm* — Sughrue Mion, PLLC

(57) ABSTRACT

A magnetic tape has a magnetic layer and a backcoat layer. Each of the magnetic layer and the backcoat layer contains a fatty acid ester. The Ra measured on the magnetic layer side surface is less than or equal to 2.8 nm. The difference between the spacing measured by optical interferometry on the magnetic layer side surface after and before vacuum heating is greater than 0 nm but less than or equal to 8.0 nm. The $FWHM_{before}$ on the backcoat layer side surface is greater than 0 nm but less than or equal to 10.0 nm. The $FWHM_{after}$ on the backcoat layer side surface is greater than 0 nm but less than or equal to 10.0 nm. The difference between the spacing measured on the backcoat layer side surface after and before vacuum heating is greater than 0 nm but less than or equal to 8.0 nm.

17 Claims, 1 Drawing Sheet

(56) References Cited

U.S. PATENT DOCUMENTS

| | | |
|---|---|---|
| 6,950,269 B1 | 9/2005 | Johnson |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,524,108 B2 | 9/2013 | Hattori |
| 8,535,817 B2 | 9/2013 | Imaoka |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,495,985 B2 | 11/2016 | Xia et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,116 B2 * | 12/2017 | Ozawa ............... G11B 5/00813 |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0170498 A1 | 9/2003 | Inoue |
| 2004/0018388 A1 | 1/2004 | Kitamura et al. |
| 2004/0053074 A1 | 3/2004 | Jingu et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0232883 A1 | 10/2006 | Biskeborn et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0081011 A1 | 4/2010 | Nakamura |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0151281 A1 | 6/2011 | Inoue |
| 2011/0244272 A1 | 10/2011 | Suzuki et al. |
| 2012/0045664 A1 * | 2/2012 | Tanaka ..................... G11B 5/71 |
| | | 428/840.2 |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 * | 3/2017 | Ozawa ..................... G11B 5/70 |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221516 A1 * | 8/2017 | Oyanagi ................... G11B 5/70 |
| 2017/0221517 A1 | 8/2017 | Ozawa et al. |
| 2017/0249963 A1 | 8/2017 | Oyanagi et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |

(56) References Cited

U.S. PATENT DOCUMENTS

| | | |
|---|---|---|
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1* | 12/2017 | Ozawa .................... G11B 5/78 |
| 2017/0372740 A1* | 12/2017 | Ozawa .................... G11B 5/78 |
| 2017/0372741 A1* | 12/2017 | Kurokawa ............ G11B 5/735 |
| 2017/0372742 A1 | 12/2017 | Kaneko et al. |
| 2017/0372743 A1 | 12/2017 | Kasada et al. |
| 2017/0372744 A1* | 12/2017 | Ozawa ................... G11B 5/584 |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350400 A1 | 12/2018 | Kaneko et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0051325 A1 | 2/2019 | Kasada et al. |
| 2019/0088278 A1 | 3/2019 | Kasada et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63249932 A | 10/1988 |
| JP | 6460819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |
| JP | 2004-185676 A | 7/2004 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-049731 A | 3/2010 |
| JP | 2011-048878 A | 3/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-77360 A | 4/2013 |
| JP | 2014-15453 A | 1/2014 |
| JP | 2014-179149 A | 9/2014 |
| JP | 2015-39801 A | 3/2015 |
| JP | 2016-15183 A | 1/2016 |

OTHER PUBLICATIONS

Notice of Allowance dated Apr. 27, 2017, which issued during the prosecution of U.S. Appl. No. 15/052,115.

Notice of Allowance dated Jun. 2, 2017, which issued during the prosecution of U.S. Appl. No. 15/218,190.

Communication dated Dec. 6, 2016 from the U.S. Patent and Trademark Office in U.S. Appl. No. 14/757,555.

Communication dated Dec. 5, 2016 from the U.S. Patent and Trademark Office in U.S. Appl. No. 14/978,834.

Notice of Allowance dated May 8, 2017, which issued during the prosecution of U.S. Appl. No. 14/757,555.

Notice of Allowance dated May 8, 2017, which issued during the prosecution of U.S. Appl. No. 14/978,834.

Notice of Allowance dated Aug. 28, 2018, which issued during the prosecution of U.S. Appl. No. 15/422,821.

Notice of Allowance dated Sep. 4, 2018, which issued during the prosecution of U.S. Appl. No. 15/625,428.

Communication dated Aug. 3, 2018 from the U.S. Patent and Trademark Office in U.S. Appl. No. 15/380,336.

Communication dated Aug. 23, 2018 from the U.S. Patent and Trademark Office in U.S. Appl. No. 15/614,876.

Communication dated Aug. 24, 2018 from the U.S. Patent and Trademark Office in U.S. Appl. No. 15/620,916.

Communication dated Aug. 23, 2018 from the U.S. Patent and Trademark Office in U.S. Appl. No. 15/621,464.

Communication dated Aug. 23, 2018 from the U.S. Patent and Trademark Office in U.S. Appl. No. 15/626,720.

Office Action dated Oct. 5, 2017, which issued during the prosecution of U.S. Appl. No. 15/241,286.

Notice of Allowance dated Mar. 21, 2018, which issued during the prosecution of U.S. Appl. No. 15/241,286.

Office Action dated Oct. 5, 2017, which issued during the prosecution of U.S. Appl. No. 15/241,297.

Office Action dated Oct. 5, 2017, which issued during the prosecution of U.S. Appl. No. 15/241,631.

Office Action dated Oct. 5, 2017, which issued during the prosecution of U.S. Appl. No. 15/378,907.

Notice of Allowance dated Mar. 19, 2018, which issued during the prosecution of U.S. Appl. No. 15/378,907.

Notice of Allowance dated Mar. 27, 2018, which issued during the prosecution of U.S. Appl. No. 15/241,631.

(56) References Cited

OTHER PUBLICATIONS

Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Oct. 3, 2018, which issued during the prosecution of U.S. Appl. No. 15/280,195.
Office Action dated Jul. 6, 2018, which issued during the prosecution of U.S. Appl. No. 15/848,173.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
Office Action dated Oct. 15, 2018, which issued during the prosecution of U.S. Appl. No. 15/619,012.
Office Action dated Oct. 9, 2018, which issued during the prosecution of U.S. Appl. No. 15/628,814.
Office Action dated Oct. 22, 2018, which issued during the prosecution of U.S. Appl. No. 15/854,439.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Sep. 27, 2018, which issued during the prosecution of U.S. Appl. No. 15/854,383.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Notice of Allowance dated Dec. 2, 2016 which issued during the prosecution of U.S. Appl. No. 14/753,227.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
Office Action dated Feb. 4, 2016 which issued during the prosecution of U.S. Appl. No. 14/753,227.
Notice of Allowance dated Jul. 12, 2017 which issued during the prosecution of U.S. Appl. No. 15/388,864.
Office Action dated Jun. 9, 2017 which issued during the prosecution of U.S. Appl. No. 15/388,864.
Office Action dated Apr. 26, 2017 which issued during the prosecution of U.S. Appl. No. 15/388,864.
Office Action dated Jun. 7, 2018 which issued during the prosecution of U.S. Appl. No. 15/380,309.
Office Action dated Aug. 3, 2018 which issued during the prosecution of U.S. Appl. No. 15/388,911.
Office Action dated May 30, 2018 which issued during the prosecution of U.S. Appl. No. 15/388,911.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.

(56) References Cited

OTHER PUBLICATIONS

Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 25, 2018 in Japanese Application No. 2015-254192.
Office Action dated Dec. 25, 2018 in Japanese Application No. 2015-245144.
Office Action dated Dec. 25, 2018 in Japanese Application No. 2015-245145.
Office Action dated Dec. 31, 2018 in U.S. Appl. No. 16/009,603.
U.S. Appl. No. 15/052,115, now U.S. Pat. No. 9,704,527.
U.S. Appl. No. 15/218,190, now U.S. Pat. No. 9,721,606.
U.S. Appl. No. 15/280,195, Pending.
U.S. Appl. No. 15/422,821, Pending.
U.S. Appl. No. 15/422,944, Allowed.
U.S. Appl. No. 15/466,143, now U.S. Pat. No. 9,837,116.
U.S. Appl. No. 15/619,012, Pending.
U.S. Appl. No. 15/624,897, filed Nov. 21, 2018.
U.S. Appl. No. 15/624,792, filed Nov. 21, 2018.
U.S. Appl. No. 15/626,832, filed Nov. 21, 2018.
U.S. Appl. No. 15/625,428, filed Dec. 4, 2018.
U.S. Appl. No. 14/978,834, now U.S. Pat. No. 9,721,605.
U.S. Appl. No. 14/757,555, now U.S. Pat. No. 9,711,174.
U.S. Appl. No. 15/197,046, now U.S. Pat. No. 9,721,607.
U.S. Appl. No. 15/380,336, filed Nov. 21, 2018.
U.S. Appl. No. 15/614,876, Pending.
U.S. Appl. No. 15/620,916, Pending.
U.S. Appl. No. 15/621,464, Pending.
U.S. Appl. No. 15/626,720, Allowed.
U.S. Appl. No. 15/854,383, Pending.
U.S. Appl. No. 15/854,507, now U.S. Pat. No. 9,984,716.
U.S. Appl. No. 15/854,439, Pending.
U.S. Appl. No. 15/854,506, now U.S. Pat. No. 10,008,230.
U.S. Appl. No. 15/848,173, Allowed.
U.S. Appl. No. 15/628,814, Pending.
U.S. Appl. No. 15/690,400, Pending.
U.S. Appl. No. 15/690,906, Pending.
U.S. Appl. No. 15/626,355, Pending.
U.S. Appl. No. 15/627,696, Pending.
U.S. Appl. No. 14/870,618, now U.S. Pat. No. 9,959,894.
U.S. Appl. No. 15/388,911, Pending.
U.S. Appl. No. 14/753,227, now U.S. Pat. No. 9,601,146.
U.S. Appl. No. 15/380,309, Pending.
U.S. Appl. No. 15/388,864, now U.S. Pat. No. 9,773,519.
U.S. Appl. No. 15/072,550, now U.S. Pat. No. 9,704,525.
U.S. Appl. No. 15/615,871, now U.S. Pat. No. 10,074,393.
U.S. Appl. No. 15/854,410, now US Pat. No. 9,972,351.
U.S. Appl. No. 15/378,907, now U.S. Pat. No. 9,984,710.
U.S. Appl. No. 15/241,631, now U.S. Pat. No. 10,026,435.
U.S. Appl. No. 14/209,065, now U.S. Pat. No. 9,530,444.
U.S. Appl. No. 15/854,474, now U.S. Pat. No. 9,978,414.
U.S. Appl. No. 15/854,403, Pending.
U.S. Appl. No. 15/241,297, now U.S. Pat. No. 10,026,434.
U.S. Appl. No. 15/241,286, now U.S. Pat. No. 10,026,433.
U.S. Appl. No. 15/464,991, now U.S. Pat. No. 9,779,772.
U.S. Appl. No. 14/867,752, now U.S. Pat. No. 10,026,430.
U.S. Appl. No. 15/854,438, Allowed.
U.S. Appl. No. 15/854,409, Allowed.
U.S. Appl. No. 15/443,026, Pending.
U.S. Appl. No. 15/920,782, now U.S. Pat. No. 10,134,433.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/900,164, Pending.
U.S. Appl. No. 15/920,518, Allowed.
U.S. Appl. No. 15/899,587, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed; RCE filed.
U.S. Appl. No. 16/009,603, Quayle Action issued (RCE filed).
U.S. Appl. No. 16/182,083, Pending (Not yet published; continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Pending.
U.S. Appl. No. 16/038,669, Pending.
U.S. Appl. No. 15/900,106, Pending.
Notice of Allowance dated Jan. 10, 2019 in U.S. Appl. No. 15/848,173.
Office Action dated Jan. 10, 2019 in U.S. Appl. No. 15/899,430.
Notice of Allowance dated Jan. 17, 2019 in U.S. Appl. No. 15/626,720.
Office Action dated Nov. 14, 2018 in U.S. Appl. No. 16/100,289.
Office Action dated Jan. 29, 2019 in U.S. Appl. No. 15/614,876.
Office Action dated Jan. 30, 2019 in U.S. Appl. No. 15/920,916.
Office Action dated Dec. 20, 2018 in U.S. Appl. No. 15/900,106.
Notice of Allowance dated Jan. 30, 2019 in U.S. Appl. No. 15/854,409.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Nov. 19, 2018 in U.S. Appl. No. 15/900,141.
Office Action dated Dec. 21, 2018 in U.S. Appl. No. 15/900,160.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 28, 2019 in U.S. Appl. No. 15/920,518.
Office Action dated Feb. 26, 2019 in Japanese Application No. 2016-123207.
Office Action dated Feb. 26, 2019 in U.S. Appl. No. 15/626,832.
Office Action dated Mar. 5, 2019 in U.S. Appl. No. 15/443,026.
Notice of Allowance dated Mar. 5, 2019 in U.S. Appl. No. 16/009,603.
Office Action dated Apr. 15, 2019 in U.S. Appl. No. 16/182,083.
Office Action dated Apr. 16, 2019 in U.S. Appl. No. 16/232,165.
"Introduction to TMR Magnetic Sensors", Anonymous, Mar. 12, 2015, MR Sensor Technology, pp. 1-5 (Year: 2015).
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.

(56) References Cited

OTHER PUBLICATIONS

Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 6, 2019 in U.S. Appl. No. 15/854,403.
Office Action dated Mar. 7, 2019 in U.S. Appl. No. 15/854,439.
Notice of Allowance dated Apr. 16, 2019 in U.S. Appl. No. 15/625,428.

* cited by examiner

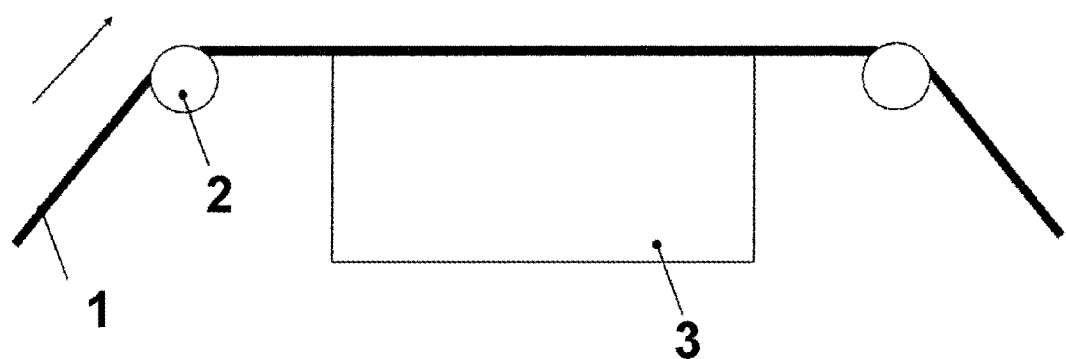

US 10,319,402 B2

MAGNETIC TAPE HAVING CHARACTERIZED BACKCOAT LAYER AND METHOD OF MANUFACTURING THE SAME

CROSS-REFERENCE TO RELATED APPLICATIONS

This application claims priority under 35 U.S.C 119 to Japanese Patent Application No. 2016-018823 filed on Feb. 3, 2016. The above application is hereby expressly incorporated by reference, in its entirety.

BACKGROUND OF THE INVENTION

Field of the Invention

The present invention relates to a magnetic tape and a method of manufacturing the same.

Discussion of the Background

Magnetic recording media include tape-shaped media and disk-shaped media. Magnetic recording media in the form of tapes, that is, magnetic tapes, are primarily employed in storage applications such as data-backup tapes. The recording and reproduction of a signal on a magnetic tape are normally conducted by loading a magnetic tape cartridge housing a magnetic tape into a drive, and running the magnetic tape within the drive to bring the surface of the magnetic tape on the magnetic layer side (also referred to hereinafter simply as the "surface of the magnetic tape") into sliding contact with a magnetic head (also referred to hereinafter simply as a "head").

The smoothness of the surface of the magnetic tape on the magnetic layer side (also referred to hereinafter as the "smoothness of the magnetic tape") has tended to increase in recent years (for example, see Japanese Unexamined Patent Publication (KOKAI) No. 2012-43495, paragraph 0003). This is because increasing the smoothness of the magnetic tape makes it possible to reduce the distance between the surface of the magnetic tape and the head during running of the magnetic tape within a drive, thereby making it possible to enhance the electromagnetic characteristics. The contents of Japanese Unexamined Patent Publication (KOKAI) No. 2012-43495 and English language family members US2012/045664A1, U.S. Pat. No. 9,311,946, and US2016/180875A1 are expressly incorporated herein by reference in their entirety.

SUMMARY OF THE INVENTION

Japanese Unexamined Patent Publication (KOKAI) No. 2012-43495 proposes controlling the state in which lubricant is present on the surface of a magnetic recording medium (specifically, a magnetic tape) on the magnetic layer side to achieve both a smoother magnetic tape and good running characteristics (see claim 1 in Japanese Unexamined Patent Publication (KOKAI) No. 2012-43495). With regard to running characteristics, in Examples of Japanese Unexamined Patent Publication (KOKAI) No. 2012-43495, the goal is to evaluate the occurrence of tape scratching and sticking with repeated running (see Japanese Unexamined Patent Publication (KOKAI) No. 2012-43495, Tables 11 to 13). That is, Japanese Unexamined Patent Publication (KOKAI) No. 2012-43495 focuses on the occurrence of tape scratching and sticking of a smoother magnetic tape.

By contrast, the present inventors presume that in a magnetic tape that has been rendered smoother to enhance the electromagnetic characteristics, it is desirable to inhibit sticking, specifically, sticking of the surface of the magnetic tape and the head with repeated running; to inhibit scratching of the surface of the magnetic tape on the magnetic layer side (referred to hereinafter as "scratching of the surface of the magnetic tape" or as "scratching"); and to inhibit head deposits, specifically, the depositing of foreign material (also referred to as debris) generated by shaving of the surface of the magnetic tape with repeated running. This will be described in detail below.

The smoother a magnetic tape is rendered, the greater the tendency for the coefficient of friction to increase during contact of the surface of the magnetic tape on the magnetic layer side and the head during running, and as a result, the greater the tendency for sticking and scratching to occur with repeated running. The occurrence of such sticking and scratching compromises running stability. In addition, when head deposits form, they insert themselves between the magnetic tape and the head, causing a drop in running stability and the like.

An aspect of the present invention provides for a magnetic tape capable of exhibiting good electromagnetic characteristics, in which the occurrence of sticking of the surface of the magnetic tape and head during running, scratching of the surface of the magnetic tape, and the formation of head deposits can be inhibited.

An aspect of the present invention relates to:

A magnetic tape having a magnetic layer containing ferromagnetic powder and binder on one surface of a nonmagnetic support and a backcoat layer containing nonmagnetic powder and binder on the other surface thereof, wherein:

the centerline average surface roughness Ra measured on the surface on the magnetic layer side of the magnetic tape is less than or equal to 2.8 nm;

the magnetic layer contains a fatty acid ester;

the difference ($S1_{after} - S1_{before}$) between the spacing $S1_{after}$ measured by optical interferometry on the surface on the magnetic layer side of the magnetic tape after vacuum heating the magnetic tape and the spacing $S1_{before}$ measured by optical interferometry on the surface on the magnetic layer side of the magnetic tape before vacuum heating the magnetic tape is greater than 0 nm but less than or equal to 8.0 nm;

the backcoat layer contains a fatty acid ester;

the full width at half maximum of the spacing distribution measured by optical interferometry on the surface on the backcoat layer side of the magnetic tape before vacuum heating the magnetic tape is greater than 0 nm but less than or equal to 10.0 nm;

the full width at half maximum of the spacing distribution measured by optical interferometry on the surface on the backcoat layer side of the magnetic tape after vacuum heating the magnetic tape is greater than 0 nm but less than or equal to 10.0 nm; and the difference ($S2_{after} - S2_{before}$) between the spacing $S2_{after}$ measured by optical interferometry on the surface on the backcoat layer side of the magnetic tape after vacuum heating the magnetic tape and the spacing $S2_{before}$ measured by optical interferometry on the surface on the backcoat layer side of the magnetic tape before vacuum heating the magnetic tape is greater than 0 nm but less than or equal to 8.0 nm.

The above magnetic tape can exhibit good electromagnetic characteristics, and can inhibit the generation of head deposits, scratching, and sticking with repeated running. The presumptions of the present inventors in this regard are set forth further below.

In the present invention and present specification, the "vacuum heating" of a magnetic tape is conducted by maintaining the magnetic tape for 24 hours in an environment of an atmospheric temperature of 70° C. to 90° C. and a pressure of greater than or equal to 200 Pa but less than or equal to 0.01 MPa.

In the present invention and present specification, the spacing that is measured by optical interferometry on the surface (also referred to as "the surface to be measured", hereinafter) on the magnetic layer side or backcoat layer side of the magnetic tape is a value measured by the following method.

A magnetic tape and a transparent, sheet-shaped member (such as a sheet of glass) are superposed with the surface to be measured of the magnetic tape facing the transparent sheet-shaped member. In this state, a pressing member is caused to apply a pressure of $5.05 \times 10^4$ N/m (0.5 atm) to the sheet-shaped member from the side opposite to the side at which the sheet-shaped member faces with the surface on the magnetic layer side (when the surface to be measured is the surface on the magnetic layer side) or on the backcoat layer side (when the surface to be measured is the surface on the backcoat layer side) of the magnetic tape. In this state, light is irradiated onto the surface to be measured of the magnetic tape through the transparent sheet-shaped member (scope of irradiation: 150,000 to 200,000 $\mu m^2$). The spacing (distance) between the surface to be measured of the magnetic tape and the surface of the transparent sheet-shaped member is obtained based on the strength of the interfering light (for example, the contrast in an interference fringe image) generated by the difference in the optical paths of the light reflecting off the surface to be measured of the magnetic tape and the light reflecting off the surface of the transparent sheet-shaped member on the magnetic tape side. The light that is irradiated is not specifically limited. When the light that is irradiated is light having emission wavelengths over a relatively broad range of wavelengths, such as white light containing multiple wavelengths, a member having the function of selectively cutting light of a specific wavelength or light outside a specific wavelength range, such as an interference filter, is disposed between the transparent sheet-shaped member and the light-receiving element receiving reflected light, and light of some portion of the wavelength or portion of the wavelength range of the reflected light is selectively caused to enter the light-receiving element. When the light that is irradiated is light having a single emission peak (so-called "monochromic light"), this member need not be employed. The wavelength of the light caused to enter the light-receiving element, for example, falls within a range of 500 nm to 700 nm, but is not specifically limited. It suffices for the transparent sheet-shaped member to be a member having a transparence such that it passes the light that is irradiated to a degree making it possible to irradiate the magnetic tape through the member and obtain interfering light.

The above measurement can be conducted with a commercial tape spacing analyzer (TSA) made by Micro Physics Corp., for example. The spacing measurement in Examples was conducted with a tape spacing analyzer made by Micro Physics Corp.

The "full width at half maximum" of the spacing distribution in the present invention and present specification refers to the full width at half maximum (FWHM) when the interference fringe image obtained by the above spacing measurement is separated into 300,000 points, the spacing of each point (the distance between the surface to be measured of the magnetic tape and the surface of the sheet-shaped member on the magnetic tape side) is determined, the values are used to plot a histogram, and the histogram is fit to a Gaussian distribution.

The difference ($S1_{after}$–$S1_{before}$) and the difference ($S2_{after}$–$S2_{before}$) refers to values obtained by subtracting the most frequent value before vacuum heating from the most frequent value after vacuum heating at the above 300,000 points.

The centerline average surface roughness Ra as measured on the surface on the magnetic layer side of the magnetic tape as referred to in the present invention and the present specification refers to the centerline average surface roughness Ra as measured in a region with an area of 40 $\mu m \times 40$ $\mu m$ on the surface on the magnetic layer side of the magnetic tape by an atomic force microscope (AFM). An example of the measurement condition is as follows. The values of the centerline average surface roughness Ra shown in Examples further below are those measured under the following condition.

AFM (Nanoscope 4 made by Veeco) is employed at a scan rate (probe displacement rate) of 40 $\mu m$/sec. and a resolution of 512 pixels×512 pixels to measure the centerline average surface roughness Ra in a region with an area of 40 $\mu m \times 40$ $\mu m$ on the surface on the magnetic layer side of the magnetic tape.

In one embodiment, the centerline average surface roughness Ra measured on the surface on the magnetic layer side of the magnetic tape is less than or equal to 2.5 nm.

In one embodiment, the nonmagnetic powder that is contained in the backcoat layer is one or more types of nonmagnetic powder selected from the group consisting of inorganic powder and carbon black.

In one embodiment, the proportion accounted for by inorganic powder falls within a range of greater than 50 weight parts to 100 weight parts per 100 weight parts of the total quantity of nonmagnetic powder contained in the backcoat layer.

In one embodiment, the full width at half maximum of the spacing distribution measured by optical interferometry on the surface on the backcoat layer side of the magnetic tape before vacuum heating the magnetic tape is greater than 0 nm but less than or equal to 5.0 nm.

In one embodiment, the full width at half maximum of the spacing distribution measured by optical interferometry on the surface on the backcoat layer side of the magnetic tape after vacuum heating the magnetic tape is greater than 0 nm but less than or equal to 5.0 nm.

In one embodiment, the difference ($S2_{after}$–$S2_{before}$) falls within a range of 0.5 nm to 6.0 nm.

In one embodiment, the difference ($S1_{after}$–$S1_{after}$) falls within a range of 0.5 nm to 5.0 nm.

A further aspect of the present invention relates to a method of manufacturing the above magnetic tape, including:

forming a coating layer by coating and drying a backcoat layer-forming composition containing nonmagnetic powder, binder, and a fatty acid ester on one surface of a nonmagnetic support, and applying vibration to the coating layer that has been formed to form a backcoat layer.

In one embodiment, the vibration is ultrasonic vibration.

An aspect of the present invention can provide a magnetic tape capable of exhibiting good electromagnetic characteristics and inhibiting the generation of head deposits, scratching, and sticking with repeated running.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein:

FIG. 1 is a schematic drawing of vibration-imparting device employed in Examples.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The magnetic tape according to an aspect of the present invention is a magnetic tape comprising a magnetic layer containing ferromagnetic powder and binder on one surface of a nonmagnetic support and a backcoat layer containing nonmagnetic powder and binder on the other surface thereof, wherein:

the centerline average surface roughness Ra measured on the surface on the magnetic layer side of the magnetic tape is less than or equal to 2.8 nm;

the magnetic layer contains a fatty acid ester;

the difference ($S1_{after} - S1_{before}$) between the spacing $S1_{after}$ measured by optical interferometry on the surface on the magnetic layer side of the magnetic tape after vacuum heating the magnetic tape and the spacing $S1_{before}$ measured by optical interferometry on the surface on the magnetic layer side of the magnetic tape before vacuum heating the magnetic tape is greater than 0 nm but less than or equal to 8.0 nm;

the backcoat layer contains a fatty acid ester;

the full width at half maximum of the spacing distribution (also referred to hereinafter as the "$FWHM_{before}$") measured by optical interferometry on the surface on the backcoat layer side of the magnetic tape before vacuum heating the magnetic tape is greater than 0 nm but less than or equal to 10.0 nm;

the full width at half maximum of the spacing distribution (also referred to hereinafter as the "$FWHM_{after}$") measured by optical interferometry on the surface on the backcoat layer side of the magnetic tape after vacuum heating the magnetic tape is greater than 0 nm but less than or equal to 10.0 nm; and the difference ($S2_{after} - S2_{before}$) between the spacing $S2_{after}$ measured by optical interferometry on the surface on the backcoat layer side of the magnetic tape after vacuum heating the magnetic tape and the spacing $S2_{before}$ measured by optical interferometry on the surface on the backcoat layer side of the magnetic tape before vacuum heating the magnetic tape is greater than 0 nm but less than or equal to 8.0 nm.

The present inventors presume items (1) to (3) below regarding the above magnetic tape.

(1) Having a centerline average surface roughness Ra measured on the surface on the magnetic layer side of the magnetic tape that is less than or equal to 2.8 nm can enhance the electromagnetic characteristics by smoothing the magnetic tape.

(2) Although protrusions present on the surface of the magnetic tape (the surface on the magnetic layer side) normally contact the head (so-called actual contact) in the course of running a magnetic tape in a drive, portions that are lower than the protrusions on the surface of the magnetic tape (referred to hereinafter as "base portions") either do not contact the head or have a low frequency of contact with it. The spacing measured by optical interferometry is presumed by the present inventors to be a value indicating the distance between the base portion and the head. However, when a lubricant contained in the magnetic layer forms a liquid film on the surface of the magnetic tape, the presence of the liquid film between the base portion and the head is thought to reduce the spacing by the amount of thickness of the liquid film.

Lubricants can be roughly divided into fluid lubricants and boundary lubricants. The above magnetic tape contains a fatty acid ester, which is generally considered to be a component that functions as a fluid lubricant. A liquid lubricant is thought to itself form a liquid film on the surface of the magnetic tape (surface on the magnetic layer side), thus serving to protect the surface of the magnetic tape. The present inventors presume that the presence of a liquid film of fatty acid ester on the surface of the magnetic tape can protect the surface of the magnetic tape and inhibit the generation of scratches. However, the present inventors presume that when an excessive amount of fatty acid ester is present on the surface of a magnetic tape, the fatty acid ester forms a meniscus (liquid bridge) between the head and the surface of the magnetic tape, causing sticking. The occurrence of sticking is thought to reduce running stability and to cause an increase in sliding friction with the head, thereby sometimes shaving the surface of the magnetic tape (the surface on the magnetic layer side) and generating head deposits.

As regards the above, the present inventors focused on the fact that a fatty acid ester is a component that has the property of being volatilized by vacuum heating. They adopted the difference in spacing ($S1_{after} - S1_{before}$) after vacuum heating (the state when the liquid film formed by fatty acid ester has been removed by volatilization) and before vacuum heating (the state when the liquid film formed by fatty acid ester is present) as an indicator of the thickness of the liquid film formed by fatty acid ester on the surface of the magnetic tape (surface on the magnetic layer side). The present inventors presume that when a liquid film of fatty acid ester is present on the surface of the magnetic tape such that this value is greater than 0 nm but less than or equal to 8.0 nm, the occurrence of sticking can be inhibited and the generation of scratching can be prevented.

(3) However, research by the present inventors has revealed that just having a difference ($S1_{after}-S1_{before}$) of greater than 0 nm but less than or equal to 8.0 nm on the surface on the magnetic layer side would be inadequate to inhibit the generation of scratching on the surface of the magnetic tape, sticking of the head to the surface of the magnetic tape with repeated running, and the generation of head deposits. The present inventors presume this to be the result of contact between the surface of the magnetic tape (surface on the magnetic layer side) with the structural components of the drive such as the head gradually removing the fatty acid ester from the surface on the magnetic layer side.

By contrast, the above magnetic tape also contains a fatty acid ester in the backcoat layer. The full width at half maximum $FWHM_{before}$ and $FWHM_{after}$ of the spacing distribution measured by optical interferometry on the surface on the backcoat layer side before and after vacuum heating the magnetic tape are both greater than 0 nm but less than or equal to 10.0 nm, and the difference ($S2_{after}-S2_{before}$) is greater than 0 nm but less than or equal to 8.0 nm. The present inventors have determined based on extensive research that this can inhibit sticking of the head and the surface of the magnetic tape with repeated running, and inhibit the generation of head deposits and scratching of the surface of the magnetic tape.

In the course of a magnetic tape repeatedly running through a drive, the magnetic tape is normally repeatedly wound up on and feed off of a reel. Contact between the surface on the backcoat layer side and the surface on the magnetic layer side when wound up on the reel is thought to cause the transfer of fatty acid ester that is present on the surface on the backcoat layer side to the surface on the magnetic layer side, supplying fatty acid ester from the surface on the backcoat layer side to the surface on the magnetic layer side. This supplying by the backcoat layer is presumed to compensate for the fatty acid ester that is lost from the surface on the magnetic layer side as set forth above. As regards this supplying, the present inventors presume that by causing a liquid film of fatty acid ester to be present in suitable quantity on the surface on the backcoat layer side and reducing variation in the thickness of the liquid film of fatty acid ester and variation in the surface shape of the backcoat layer itself, it is possible to enhance the transfer efficiency when the surface on the backcoat layer side and the surface on the magnetic layer side come into contact and fatty acid ester is transferred to the surface on the magnetic layer side, and to prevent transfer of unevenly distributed fatty acid ester to the surface on the magnetic layer side (that is, enhance the uniformity of transfer). Although the details are unclear, the present inventors presume that efficiently transferring a suitable quantity of fatty acid ester to the surface on the magnetic layer can contribute primarily to inhibiting the occurrence of sticking and scratching, and enhancing the uniformity of the transfer can contribute primarily to inhibiting shaving of the surface on the magnetic layer side and the generation of deposits.

In this regard, the present inventors presume in relation to the fatty acid ester contained in the backcoat layer that on the surface on the backcoat layer side of the magnetic tape, as set forth above, the difference in spacing ($S2_{after}-S2_{before}$) after vacuum heating (the state where the liquid film formed of fatty acid ester has been removed) and before heating (the state where the liquid film formed of fatty acid ester is present) is an indicator of the thickness of the liquid film formed of fatty acid ester on the surface on the backcoat layer side of the magnetic tape. Although the details are unclear, the present inventors presume that keeping this difference ($S2_{after}-S2_{before}$) to greater than 0 nm but less than or equal to 8.0 nm primarily can contribute to the efficient transfer of a suitable quantity of fatty acid ester to the surface on the magnetic layer side.

The smaller the full width at half maximum of the spacing distribution measured on the surface on the backcoat layer side, the less the variation indicated in the value of the spacing that is measured for various parts of the surface of the magnetic tape on the backcoat layer side. In this regard, the reasons for variation in the value of the spacing measured on the surface on the backcoat layer side are presumed to be variation in the surface shape of the backcoat layer of the magnetic tape itself (for example, variation due to the state of dispersion of the nonmagnetic powder contained in the backcoat layer) and variation in the thickness of the liquid film formed of fatty acid ester. The spacing distribution $FWHM_{before}$ measured before vacuum heating, that is, in a state where a liquid film of fatty acid ester is present on the surface on the backcoat layer side of the magnetic tape, can increase with variation in the surface shape of the backcoat layer itself and with variation in the thickness of the liquid film of fatty acid ester. The present inventors presume that of these, variation in the thickness of the liquid film of fatty acid ester has the greater effect. By contrast, the present inventors presume that the spacing distribution $FWHM_{after}$ measured after vacuum heating, that is, in a state where the liquid film of fatty acid ester has been removed from the surface of the magnetic tape on the backcoat layer side, can increase with variation in the surface shape of the backcoat layer itself. Although the details are unclear, the present inventors presume that having a surface on the backcoat layer side such that the difference ($S2_{after}-S2_{before}$) falls within the range set forth above, and such that the full width at half maximum of the spacing distribution before and after vacuum heating falls within the range set forth above, can contribute primarily to enhancing even transfer of fatty acid ester from the surface on the backcoat layer side to the surface on the magnetic layer side. Although Japanese Unexamined Patent Publication (KOKAI) No. 2012-43495 describes spacing, there is no description of the spacing measured on the surface on the backcoat layer side, no description of the spacing relating to the spacing before and after vacuum heating or the spacing distribution, and no description suggesting that the spacing distribution be controlled in Japanese Unexamined Patent Publication (KOKAI) No. 2012-43495.

However, the above are merely presumptions by the present inventors, and the present invention is not to be construed as being limited by them in any way.

The above magnetic tape will be described in greater detail. The surface of the magnetic tape on the magnetic layer side will also be referred to the magnetic layer side surface below. The surface of the magnetic tape on the backcoat layer side will also be referred to as the backcoat layer side surface.

[Centerline Average Surface Roughness Ra Measured on the Surface on the Magnetic Layer Side]

The centerline average surface roughness Ra measured on the surface on the magnetic layer side of the magnetic tape is less than or equal to 2.8 nm. Thus, the magnetic tape can exhibit good electromagnetic characteristics. From the perspective of further enhancing the electromagnetic characteristics, the Ra on the magnetic layer side is desirably less than or equal to 2.5 nm, preferably less than or equal to 2.3 nm, and more preferably, less than or equal to 2.0 nm. The Ra on the magnetic layer side can be, for example, greater than or equal to 1.2 nm. However, from the perspective of enhancing the electromagnetic characteristics, the lower the centerline average surface roughness Ra, the better. It can thus fall below these values given by way of example.

The Ra on the magnetic layer side can be controlled by known methods. For example, the Ra on the magnetic layer side can be varied by the size of the various powders (such as ferromagnetic powder and nonmagnetic powder that can be optionally incorporated into the magnetic layer) contained in the magnetic layer, the manufacturing conditions of the magnetic tape, and the like. Thus, these can be adjusted to obtain a magnetic tape with an Ra on the magnetic layer side of less than or equal to 2.8 nm.

[Difference ($S1_{after}-S1_{before}$)]

The difference in spacing ($S1_{after}-S1_{before}$) before and after vacuum heating that is measured on the surface on the magnetic layer side of the magnetic tape is greater than 0 nm but less than or equal to 8.0 nm. The present inventors presume that this can prevent the generation of scratching while inhibiting the occurrence of sticking. From the perspective of further inhibiting the generation of scratching, the difference ($S1_{after}-S1_{before}$) is desirably greater than or equal to 0.1 nm, preferably greater than or equal to 0.5 nm, and more preferably, greater than or equal to 1.0 nm. From the perspective of further inhibiting the occurrence of sticking of the head and the surface of the magnetic tape on the magnetic layer side during running, the difference ($S1_{after}-S1_{before}$) is desirably less than or equal to 7.0 nm, preferably less than or equal to 6.5 nm, more preferably less than or equal to 6.0 nm, still more preferably less than or equal to 5.5 nm, yet more preferably less than or equal to 5.0 nm, and yet still more preferably, less than or equal to 4.5 nm. The difference ($S1_{after}-S1_{before}$) can be controlled by means of the quantity of fatty acid ester that is added to the magnetic layer-forming composition. For magnetic tapes having a nonmagnetic layer between the nonmagnetic support and magnetic layer, it can also be controlled by means of the quantity of fatty acid ester added to the nonmagnetic layer-forming composition. This is because the nonmagnetic layer can play the roles of holding lubricant and supplying it to the magnetic layer, and thus the fatty acid ester contained in the nonmagnetic layer can migrate to the magnetic layer side and can be present in the magnetic layer.

[Full Width at Half Maximum of the Spacing Distribution $FWHM_{before}$ and $FWHM_{after}$]

The full width at half maximum of the spacing distribution $FWHM_{before}$ before vacuum heating and $FWHM_{after}$ after vacuum heating that are measured on the surface on the backcoat layer side of the magnetic tape are both greater than 0 nm but less than or equal to 10.0 nm. The presumptions of the present inventors in this regard are as set forth above. From the perspective of further inhibiting head deposits, the $FWHM_{before}$ and the $FWHM_{after}$ are desirably less than or equal to 9.0 nm, preferably less than or equal to 8.0 nm, more preferably less than or equal to 7.0 nm, still more preferably less than or equal to 6.0 nm, and yet more preferably, less than or equal to 5.0 nm. The $FWHM_{before}$ and the $FWHM_{after}$ can be, for example, greater than or equal to 1.0 nm. However, the lower the value, the better. Thus, they can fall below these values given by way of example.

The full width at half maximum of the spacing distribution $FWHM_{before}$ before vacuum heating can be primarily reduced by diminishing variation in the thickness of the liquid film of fatty acid ester. Specific means of achieving this will be set forth further below. The full width at half maximum of the spacing distribution $FWHM_{after}$ after vacuum heating can be reduced by diminishing variation in the shape of the surface on the backcoat layer side. Thus, it is desirable to enhance dispersion of the nonmagnetic powder in the backcoat layer-forming composition. The dispersion can be adjusted by the type of nonmagnetic powder employed to form the backcoat layer and by the blending ratio or the like when two or more types of nonmagnetic powder are incorporated. Specific examples of means of achieving this will be set forth further below.

[Difference ($S2_{after}-S2_{before}$)]

The difference ($S2_{after}-S2_{before}$) in spacing before and after vacuum heating that is measured on the surface on the backcoat layer side of the magnetic tape is greater than 0 nm but less than or equal to 8.0 nm. The presumptions of the present inventors in this regard are as set forth above. From the perspective of further inhibiting the generation of scratching and sticking, the difference ($S2_{after}-S2_{before}$) is desirably greater than or equal to 0.1 nm, preferably greater than or equal to 0.5 nm, and more preferably, greater than or equal to 1.0 nm. From the same perspective, the difference ($S2_{after}-S2_{before}$) is desirably less than or equal to 7.0 nm, preferably less than or equal to 6.5 nm, more preferably less than or equal to 6.0 nm, still more preferably less than or equal to 5.5 nm, and yet more preferably, less than or equal to 5.0 nm. The difference ($S2_{after}-S2_{before}$) can be controlled by means of the quantity of fatty acid ester that is added to the backcoat layer-forming composition. The greater the quantity of fatty acid ester that is added to the backcoat layer-forming composition, the greater the difference ($S2_{after}-S2_{before}$) tends to become.

The magnetic layer, backcoat layer, nonmagnetic support, and optionally incorporated nonmagnetic layer of the above magnetic tape will be further described below.

[Magnetic Layer]

<Fatty Acid Ester>

The above magnetic tape contains a fatty acid ester in the magnetic layer. A single type of fatty acid ester or two or more types can be incorporated into the magnetic layer. Examples of fatty acid esters are esters of lauric acid, myristic acid, palmitic acid, stearic acid, oleic acid, linoleic acid, linolenic acid, behenic acid, erucic acid, and eraidic acid. Specific examples are butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The quantity of fatty acid ester, as the content of fatty acid ester in the magnetic layer-forming composition, is, for example, 0.1 to 10.0 weight parts, desirably 0.5 to 8.0 weight parts, and preferably, 1.0 to 7.0 weight parts, per 100.0 weight parts of ferromagnetic powder. When two or more different fatty acid esters are employed as the fatty acid ester, the content refers to the combined content thereof. Unless specifically stated otherwise, the same applies to the contents of other components in the present invention and the present specification.

When a nonmagnetic layer is present between the nonmagnetic support and magnetic layer in the above magnetic tape, the content of fatty acid ester in the nonmagnetic layer-forming composition is, for example, 0 to 10.0 weight parts, desirably 0.1 to 8.0 weight parts, per 100.0 weight parts of nonmagnetic powder.

<Other Lubricants>

The above magnetic tape contains a fatty acid ester, which is one type of lubricant. It can also optionally contain lubricants other than fatty acid esters in the magnetic layer and/or nonmagnetic layer. As set forth above, the lubricants that are contained in the nonmagnetic layer can migrate to the magnetic layer side and be present in the magnetic layer. Fatty acids are an example of lubricants that are optionally contained. Fatty acid amides are further examples. While fatty acid esters are components that can function as fluid lubricants, fatty acids and fatty acid amides are components that can function as boundary lubricants. Boundary lubricants are thought to adsorb to the surface of powder (such as ferromagnetic powder) and form a strong lubricating film, thereby lowering contact friction.

Examples of fatty acids are lauric acid, myristic acid, palmitic acid, stearic acid, oleic acid, linoleic acid, linolenic acid, behenic acid, erucic acid, and eraidic acid. Stearic acid, myristic acid, and palmitic acid are desirable. Stearic acid is preferred. The fatty acid can be contained in the form of a salt such as a metal salt in the magnetic layer.

Examples of fatty acid amides are the amides of the various fatty acids set forth above. Examples are amide laurate, amide myristate, amide palmitate, and amide stearate.

With regard to fatty acids and fatty acid derivatives (such as amides and esters), the fatty acid-derived portion of the fatty acid derivative desirably has a structure that is identical or similar to any fatty acid with which it is employed in combination. For example, when employing a fatty acid in the font) of stearic acid, it is desirable to employ a stearic acid ester and/or amide stearate.

The content of fatty acids in the magnetic layer-forming composition is, for example, 0 to 10.0 weight parts, desirably 0.1 to 10.0 weight parts, preferably 0.5 to 8.0 weight parts, and more preferably, 1.0 to 7.0 weight parts, per 100.0 weight parts of ferromagnetic powder. The content of fatty acid amides in the magnetic layer-forming composition is, for example, 0 to 3.0 weight parts, desirably 0 to 2.0 weight parts, and preferably, 0 to 1.0 weight part per 100.0 weight parts of ferromagnetic powder.

When a nonmagnetic layer is present between the nonmagnetic support and magnetic layer in the above magnetic tape, the content of fatty acids in the nonmagnetic layer-forming composition is, for example, 0 to 10.0 weight parts, desirably 1.0 to 10.0 weight parts, and preferably, 1.0 to 7.0 weight parts per 100.0 weight parts of nonmagnetic powder. The content of fatty acid amides in the nonmagnetic layer-forming composition is, for example, 0 to 3.0 weight parts, desirably 0 to 1.0 weight part, per 100.0 weight parts of nonmagnetic powder.

<Ferromagnetic Powder>

The various powders that are commonly employed as ferromagnetic powders in the magnetic layer of various magnetic recording media can be employed as the ferromagnetic powder. The use of a ferromagnetic powder of small average particle size is desirable from the perspective of increasing the recording density of the magnetic tape. For this reason, it is desirable to employ ferromagnetic powder with an average particle size of less than or equal to 50 nm as the ferromagnetic powder. From the perspective of stability of magnetization, the average particle size of the ferromagnetic powder is desirably greater than or equal to 10 nm.

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The average particle size of various powders such as ferromagnetic powder is a value measured with a transmission electron microscope by the following method.

Powder is photographed at a magnification of 100,000-fold with a transmission electron microscope, and the photograph is printed on print paper at a total magnification of 500,000-fold to obtain a photograph of the particles constituting the powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and present specification, the average particle size of the powder, such as ferromagnetic powder and various kinds of powder is the average particle size as obtained by the above method unless specifically stated otherwise. The average particle size indicated in Examples further below was obtained using a Model H-9000 transmission electron microscope made by Hitachi and KS-400 image analysis software made by Carl Zeiss. In the present invention and present specification, the term "powder" means a collection of multiple particles. For example, the term "ferromagnetic powder" means a collection of multiple ferromagnetic particles. The term "collection" is not limited to forms in which the constituent particles are in direct contact, but also includes forms in which binder, additives, or the like are present between the particles. The term "particles" is also sometimes employed to denote powder.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and present specification, the size of the particles constituting powder (referred to as the "particle size", hereinafter) is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

Unless specifically stated otherwise, when the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The content (fill rate) of ferromagnetic powder in the magnetic layer desirably falls within a range of 50 to 90 weight %, and preferably falls within a range of 60 to 90 weight %. A high fill rate is desirable from the perspective of increasing the recording density.

<Binder>

The magnetic layer of the above magnetic tape contains binder in addition to ferromagnetic powder and fatty acid ester. Binder is one or more resins. The binder employed can be in the form of polyurethane resin, polyester resin, polyamide resin, vinyl chloride resin, acrylic resin obtained by copolymerizing styrene, acrylonitrile, methyl methacrylate and the like, nitrocellulose and other cellulose resins, epoxy resin, phenoxy resin, polyvinyl acetal, polyvinyl butyral, and other polyvinyl alkyrals. These resins can be employed singly or two or more resins can be mixed for use. Of these, polyurethane resin, acrylic resin, cellulose resin and vinyl chloride resin are desirable. These resins can be homopolymer or copolymer. They can also be employed as binder in the nonmagnetic layer and backcoat layer described further below. Reference can be made to Japanese Unexamined Patent Publication (KOKAI) No. 2010-24113, paragraphs 0028 to 0031, with regard to the binder. The content of the above publication is expressly incorporated herein by reference in its entirety. The binder can also be radiation-curable resin such as electron beam-curable resin. Reference can be made to Japanese Unexamined Patent Publication (KOKAI) No. 2011-48878, paragraph 0044 and 0045, with regard to radiation-curable resin.

Curing agents can be employed along with the above resin that can be employed as the binder. Curing agents are compounds containing one or more crosslinkable functional groups per molecule. Polyisocyanates are suitable as curing agents. Reference can be made to Japanese Unexamined Patent Publication (KOKAI) No. 2011-216149, paragraphs 0124 and 0125, for details regarding polyisocyanates. The curing agent can be employed, for example, in a quantity of 0 to 80.0 weight parts, and desirably 50.0 to 80.0 weight parts from the perspective of enhancing the strength of the various layers such as the magnetic layer, per 100.0 weight parts of binder.

<Additives>

Additives can be added as needed to the magnetic layer. Examples of additives are nonmagnetic powder, lubricants, dispersing agents, dispersion adjuvants, antifungal agents, antistatic agents, oxidation inhibitors, and carbon black. Commercial products can be suitably selected based on the properties desired for use as additives.

One or more kinds of nonmagnetic powder are desirably contained in the magnetic layer. An example of the nonmagnetic powder is nonmagnetic powder that is capable of functioning as a protrusion-forming agent forming protrusions that suitably protrude from the surface on the magnetic layer side (referred to as a "protrusion-forming agent" hereinafter). The protrusion forming agent is a component that can contribute to controlling the friction characteristics of the surface on the magnetic layer side of the magnetic tape. Nonmagnetic powder capable of functioning as an abrasive (referred to as an "abrasive" hereinafter) can also be contained in the magnetic layer. At least a protrusion-forming agent or an abrasive, or both, are desirably contained in the magnetic layer of the magnetic tape.

The various kinds of nonmagnetic powder that are commonly employed as the protrusion-forming agent can be employed as the protrusion forming agent. These can be inorganic materials or organic materials. In one embodiment, from the perspective of achieving uniform friction characteristics, the particle size distribution of the protrusion-forming agent is desirably that of a monodispersion exhibiting a single peak, and not that of a multiple dispersion exhibiting a distribution with multiple peaks. From the perspective of the availability of monodisperse particles, nonmagnetic powder in the form of powder of an inorganic material (inorganic powder) is desirable. Examples of inorganic powder are various powders of metal oxides, metal carbonates, metal sulfates, metal nitrides, metal carbides, and metal sulfides. Inorganic oxide powders are desirable. The protrusion-forming agent is preferably a colloidal particle, more preferably an inorganic oxide colloidal particle. From the perspective of the availability of monodisperse particles, the inorganic oxide constituting the inorganic oxide colloidal particles is desirably silicon dioxide (silica). The inorganic oxide colloidal particles are preferably colloidal silica (silica colloid particles). In the present invention and present specification, the term "colloidal particles" refers to particles that are capable of dispersing to yield a colloidal dispersion without precipitating, when added in a quantity of 1 g per 100 mL to at least one organic solvent in the form of at least methyl ethyl ketone, cyclohexanone, toluene, or ethyl acetate, or a mixed solvent containing two or more of these solvents in any blending ratio. The average particle size of the colloidal particles is a value that is determined by the method set forth as an average particle diameter measurement method in Japanese Unexamined Patent Publication (KOKAI) No. 2011-048878, paragraph 0015. The content of the above publication is expressly incorporated herein by reference in its entirety. In another embodiment, the protrusion-forming agent is desirably carbon black.

The average particle size of the protrusion-forming agent is, for example, 30 nm to 300 nm, desirably 40 nm to 200 nm.

Examples of abrasives are materials that are commonly employed as abrasives in the magnetic layer in the form of various kinds of powder of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond. Of these, alumina powders such as α-alumina and silicon carbide powders are desirable. The average particle size of the nonmagnetic powder capable of functioning as an abrasive falls, for example, within a range of 30 nm to 300 nm, and desirably within a range of 50 nm to 200 nm.

From the perspective of the protrusion-forming agent and abrasive properly performing their various functions, the content of the protrusion-forming agent in the magnetic layer is desirably 1.0 to 4.0 weight parts, preferably 1.5 to 3.5 weight parts, per 100.0 weight parts of ferromagnetic powder. The content of abrasive in the magnetic layer is desirably 1.0 to 20.0 weight parts, preferably 3.0 to 15.0 weight parts, and more preferably, 4.0 to 10.0 weight parts, per 100.0 weight parts of ferromagnetic powder.

An example of an additive that can be employed in a magnetic layer containing abrasive is the dispersant for enhancing dispersion of the abrasive in the magnetic layer-forming composition that is described in Japanese Unexamined Patent Publication (KOKAI) No. 2013-131285, paragraphs 0012 to 0022. The content of the above publication is expressly incorporated herein by reference in its entirety. Enhancing dispersion of nonmagnetic powder such as abrasive in the magnetic layer-forming composition is desirable to lower the centerline average surface roughness Ra measured on the surface on the magnetic layer side.

[Nonmagnetic Layer]

The nonmagnetic layer will be described next. The magnetic tape can have a magnetic layer positioned directly on the surface of a nonmagnetic support, or can have a nonmagnetic layer containing nonmagnetic powder and binder between the nonmagnetic support and magnetic layer. The nonmagnetic powder that is employed in the nonmagnetic layer can be an organic or an inorganic material. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content of nonmagnetic powder in the nonmagnetic layer desirably falls within a range of 50 to 90 weight percent, preferably within a range of 60 to 90 weight percent.

Known techniques relating to binders, additives and the like of the nonmagnetic layer can be applied to the nonmagnetic layer. In addition, for example, known techniques relating to magnetic layers can be applied as regards the quantity and type of binder and the quantities and types of additives.

The nonmagnetic layer of the above magnetic tape may be in the form of an essentially nonmagnetic layer containing small quantities of ferromagnetic powder, either in the form of impurities or by intention, for example, along with nonmagnetic powder. The term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

[Backcoat Layer]

In the above magnetic tape, a backcoat layer containing nonmagnetic powder and binder is present on the opposite surface of the nonmagnetic support from the surface on which the magnetic layer is present. The backcoat layer contains a fatty acid ester. The backcoat layer can also contain lubricants other than fatty acid esters, such as fatty acids and fatty acid amides. Reference can be made to the description of the magnetic layer set forth above with regard to the types of fatty acid esters contained in the backcoat layer and the type of fatty acids and fatty acid amides that can be incorporated into the backcoat layer.

The quantity of fatty acid ester, as the content of fatty acid ester in the backcoat layer-forming composition, is, for example, 0.1 to 3.0 weight parts, desirably 0.1 to 2.0 weight parts, and preferably, 0.1 to 1.0 weight part, per 100.0 weight parts of nonmagnetic powder.

The quantity of fatty acid, as the content of fatty acid in the backcoat layer-forming composition, is, for example, 0 to 3.0 weight parts, desirably 0 to 2.0 weight parts, and preferably 0 to 1.0 weight part, and further preferably, 0 to 0.5 weight part per 100.0 weight parts of nonmagnetic powder. The quantity of fatty acid amide, as the content of fatty acid amide in the backcoat layer-forming composition, is, for example, 0 to 3.0 weight parts, desirably 0 to 2.0 weight parts, and preferably, 0 to 1.0 weight part, per 100.0 weight parts of nonmagnetic powder.

Reference can be made to the description set forth above in relation to the nonmagnetic powder contained in the nonmagnetic layer for types of nonmagnetic powder contained in the backcoat layer. The nonmagnetic powder that is contained in the backcoat layer is desirably one or more types of nonmagnetic powder selected from the group consisting of inorganic powder and carbon black. Inorganic powder generally tends to disperse better in the backcoat layer-forming composition than carbon black. Increasing the degree of dispersion of the backcoat layer-forming composition can contribute to reducing variation in the shape of the surface on the backcoat layer side. Accordingly, an example of a method of adjusting the full width at half maximum of the spacing distribution $FWHM_{after}$ after vacuum heating, which is thought to be a value that decreases with variation in the shape of the surface on the backcoat layer side, is adjusting the type of nonmagnetic powder contained in the backcoat layer and, when two or more types of nonmagnetic powder are employed, adjusting the blending ratio thereof. For example, inorganic powder is desirably employed as the main powder (the nonmagnetic powder contained in the greatest quantity by weight in the nonmagnetic powder) in the nonmagnetic powder of the backcoat layer. When the nonmagnetic powder that is contained in the backcoat layer is one or more types of nonmagnetic powder selected from the group consisting of inorganic powder and carbon black, the proportion accounted for by the inorganic powder desirably falls within a range of greater than 50.0 weight parts to 100.0 weight parts, preferably falls within a range of 60.0 weight parts to 100.0 weight parts, more preferably falls within a range of 70.0 weight parts to 100.0 weight parts, and still more preferably, falls within a range of 80.0 to 100.0 weight parts, per 100.0 weight parts of the total quantity of nonmagnetic powder.

The average particle size of the nonmagnetic powder, for example, falls within a range of 10 nm to 200 nm. The average particle size of the inorganic powder desirably falls within a range of 50 nm to 200 nm, preferably within a range of 80 nm to 150 nm. The average particle size of the carbon black desirably falls within a range of 10 nm to 50 nm, preferably within a range of 15 nm to 30 nm.

The degree of dispersion of the nonmagnetic powder in the backcoat layer-forming composition can be increased by using known dispersing agents, by intensifying the dispersion conditions, and the like.

A desirable method of adjusting the full width at half maximum of the spacing distribution $FWHM_{before}$ before vacuum heating will be set forth further below.

Known techniques relating to the formulas of the magnetic layer and/or nonmagnetic layer can be applied to the binder and various optional additives contained in the backcoat layer.

[Nonmagnetic Support]

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

[Thicknesses of Nonmagnetic Support and Various Layers]

The thickness of the nonmagnetic support and various layers in the above magnetic tape are as follows. The thickness of the nonmagnetic support is, for example, 3.00 µm to 80.00 µm, desirably 3.00 µm to 50.00 µm, and preferably 3.00 µm to 10.00 µm.

From the perspective of high-density recording that is demanded in recent years, the thickness of the magnetic layer is desirably less than or equal to 100 nm. The thickness of the magnetic layer is preferably 10 nm to 100 nm, more preferably 20 nm to 90 nm. The magnetic layer can be comprised of a single layer, or the magnetic layer can be separated into two or more layers with different magnetic characteristics. Known multilayer magnetic layer structures can be applied.

The thickness of the nonmagnetic layer is, for example, 0.10 µm to 1.50 µm, desirably 0.10 µm to 1.00 µm.

The thickness of the backcoat layer is desirably less than or equal to 0.90 µm, preferably 0.10 µm to 0.70 µm.

The thickness of the various layers of the magnetic tape and of the nonmagnetic support can be determined by known film thickness-measuring methods. For example, a cross-section in the direction of thickness of the magnetic tape is exposed by a known method such as an ion beam or a microtome, after which the exposed cross-section is observed with a scanning electron microscope. Various thicknesses, such as the thickness determined in one spot in the direction of thickness while observing the cross-section, or the arithmetic average of the thickness determined in two or more randomly extracted spots—for example, two spots—can be determined. Alternatively, the thickness of each layer can be determined as a design thickness calculated from the manufacturing conditions.

[Manufacturing Method]

<Preparation of the Various Layer-Forming Compositions>

The compositions for forming the magnetic layer, backcoat layer, and optionally provided nonmagnetic layer normally contain solvent in addition to the various components that have been set forth above. The various types of organic solvent that are commonly employed to manufacture particulate magnetic recording media are examples of the solvent. As specific examples, ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methyl cyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethyl formamide, hexane and the like can be employed in any ratio.

The process of preparing the compositions for forming the various layers, such as the magnetic layer, the backcoat layer and the nonmagnetic layer that is optionally provided, normally includes at least a kneading step, a dispersion step, and mixing steps provided before and after these steps as needed. Each of these steps can be divided into two or more stages. All of the starting materials in the form of ferromagnetic powder, nonmagnetic powder, binder, fatty acid ester, various additives, solvent and the like that are employed in the present invention can be added at the start, or part way through, any of these steps. An individual starting material can be divided for addition in two or more steps. For example, binder can be divided up and added in the kneading step, dispersing step, and in a kneading step after the dispersing step for viscosity adjustment. To manufacture the magnetic tape, conventionally known manufacturing techniques can be employed. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter (bead diameter) and fill rate of these dispersion beads can be optimized for use. A known disperser can be employed.

<Coating Step>

The magnetic layer can be formed by directly coating the magnetic layer-forming composition on the surface of a nonmagnetic support, or by sequentially or simultaneously multilayer coating it along with a nonmagnetic layer-forming composition. The backcoat layer can be formed by coating a backcoat layer-forming composition on the surface on the opposite side of the nonmagnetic support from that on which the magnetic layer is present (or will be subsequently provided). For details regarding coatings to form the various layers, reference can be made to Japanese Unexamined Patent Publication (KOKAI) No. 2010-231843, paragraph 0066. The content of the above publication is expressly incorporated herein by reference in its entirety.

<Other Steps>

For various other steps in manufacturing the magnetic tape, reference can be made to paragraphs 0067 to 0070 of Japanese Unexamined Patent Publication (KOKAI) No. 2010-231843.

<Embodiment of Desirable Manufacturing Method>

An example of a desirable manufacturing method is the manufacturing method of subjecting a coating layer of the backcoat layer-forming composition to vibration to enhance uniformity of the thickness of the liquid film of fatty acid ester on the surface on the backcoat layer side of the magnetic tape. The present inventors presume that applying vibration can cause the liquid film of fatty acid ester on the surface of the coating layer to flow, enhancing the uniformity in thickness of the liquid film of fatty acid ester that has formed on the surface on the backcoat layer side. The present inventors presume that the enhanced uniformity in thickness of the liquid film is desirable to control the full width at half maximum of the spacing distribution FWHM$_{before}$ before vacuum heating to within a range of greater than 0 nm but less than or equal to 10.0 nm.

That is, an aspect of the present invention relates to a method of manufacturing the above magnetic tape, including:

forming a coating layer by coating and drying a backcoat layer-forming composition containing nonmagnetic powder, binder, and a fatty acid ester on one surface of a nonmagnetic support, and applying vibration to the coating layer that has been formed.

With the exception that vibration is applied to the coating layer of the backcoat layer-forming composition, the process is identical to the process of manufacturing a common magnetic tape. The details are as set forth above.

The means of applying the above vibration is not specifically limited. For example, the vibration can be applied to the coating layer by bringing the surface of the nonmagnetic support on the opposite side from that on which the coating layer of the backcoat layer-forming composition has been formed into contact with a vibration-imparting unit. It is also possible to conduct running while contacting the nonmagnetic support on which the coating layer has been formed with a vibration-imparting unit. The vibration can be ultrasonic vibration. For example, an ultrasonic vibrator can be mounted within a vibration-imparting unit to apply ultrasonic vibration to a product brought into contact with the unit. The vibration that is applied to the coating layer can be adjusted by means of the vibration frequency and intensity of the ultrasonic vibrator, and the duration of contact with the vibration-imparting unit. For example, the contact period can be adjusted during contact with the vibration-imparting unit based on the running speed of the nonmagnetic support on which the coating layer has been formed. These vibration-imparting conditions are not specifically limited. It suffices to set them so as to control the above-described full width at half maximum of the spacing distribution FWHM$_{before}$ before vacuum heating. Preliminary testing can be conducted prior to actual manufacturing to set the vibration-imparting conditions and the conditions can be optimized.

An example of a preferred manufacturing method is a manufacturing method including:

after having formed the backcoat layer as set forth above, coating the magnetic layer-forming composition directly onto the opposite surface of the nonmagnetic support from that on which the backcoat layer has been formed, or after having formed the backcoat layer as set forth above, sequentially or simultaneously multilayer coating the magnetic layer-forming composition and nonmagnetic layer-forming composition on the opposite surface of the nonmagnetic support from that on which the backcoat layer has been formed.

Embodiments of desirable manufacturing methods have been described above. However, the magnetic tape according to an aspect of the present invention is not limited to being manufactured by the above manufacturing method.

The above magnetic tape can be housed within a magnetic tape cartridge by winding it on a reel mounted in rotatable fashion within the magnetic tape cartridge. The magnetic tape cartridge in which the magnetic tape has been housed can be loaded into a drive and the magnetic tape can be run within the drive to record a signal on the magnetic tape and/or reproduce (read) a signal that has been recorded on the magnetic tape. The above magnetic tape can exhibit good electromagnetic characteristics during the reproduction of recorded signals and can inhibit the generation of head deposits, the occurrence of scratching of the surface of the magnetic tape, and sticking of the head to the surface of the magnetic tape during running within the drive.

EXAMPLES

The present invention will be described in greater detail below through Examples. However, the present invention is not limited to the embodiments shown in Examples. The "parts" and "percent (%)" indicated below denote "weight parts" and "weight percent (%)", unless otherwise stated.

Example 1

<Magnetic Layer-Forming Composition>

| (Magnetic liquid) | |
|---|---|
| Ferromagnetic hexagonal barium ferrite powder: (coercive force Hc: 2,100 Oe (168 kA/m), average particle size: 25 nm) | 100.0 parts |
| Sulfonic acid group-containing polyurethane resin: | 15.0 parts |
| Cyclohexanone: | 150.0 parts |
| Methyl ethyl ketone: | 150.0 parts |
| (Abrasive liquid) | |
| α-Alumina (average particle size: 110 nm): | 9.0 parts |
| Vinyl chloride copolymer (MR110 made by Zeon Corp.) | 0.7 part |
| Cyclohexanone: | 20.0 parts |
| (Silica sol) | |
| Colloidal silica (average particle size: 120 nm): | 3.5 parts |
| Methyl ethyl ketone: | 8.2 parts |
| (Other components) | |
| Butyl stearate: | See Table 1 |
| Stearic acid: | See Table 1 |
| Polyisocyanate (Coronate made by Nippon Polyurethane Industry Co., Ltd.): | 2.5 parts |
| (Solvents added to finish) | |
| Cyclohexanone: | 180.0 parts |
| Methyl ethyl ketone: | 180.0 parts |

<Nonmagnetic Layer-Forming Composition>

| | |
|---|---|
| Nonmagnetic inorganic powder (α-iron oxide): (average particle size: 150 nm, average acicular ratio: 7, Brunauer-Emmett-Teller (BET) specific surface area: 52 m$^2$/g) | 80.0 parts |
| Carbon black (average particle size: 20 nm): | 20.0 parts |
| Electron-beam curable vinyl chloride copolymer: | 13.0 parts |
| Electron-beam curable polyurethane resin: | 6.0 parts |
| Phenylphosphonic acid: | 3.0 parts |
| Cyclohexanone: | 140.0 parts |
| Methyl ethyl ketone: | 170.0 parts |
| Butyl stearate: | 2.0 parts |
| Stearic acid: | 1.0 part |

<Backcoat Layer-Forming Composition>

| | |
|---|---|
| Nonmanetic powder | 100.0 parts |
| Inorganic powder (α-iron oxide): (average particle size: 150 nm, average acicular ratio: 7, BET specific surface area: 52 m$^2$/g) | Blending ratio: see Table 1 |
| Carbon black (average particle size: 20 nm): | Blending ratio: see Table 1 |
| Vinyl chloride copolymer: | 13.0 parts |
| Sulfonic acid group-containing polyurethane resin: | 6.0 parts |
| Phenylphosphonic acid: | 3.0 parts |
| Cyclohexanone: | 140.0 parts |
| Methyl ethyl ketone: | 170.0 parts |
| Butyl stearate: | See Table 1 |
| Stearic acid: | See Table 1 |
| Polyisocyanate (Coronate made by Nippon Polyurethane Industry Co., Ltd.): | 5.0 parts |
| Methyl ethyl ketone: | 400.0 parts |

<Preparation of Various Layer-Forming Compositions>

A magnetic layer-forming composition was prepared by the following method.

The above magnetic liquid was kneaded and dilution processed in an open kneader and then subjected to 12 passes of dispersion processing, with a single-pass retention time of 2 minutes, a rotor tip peripheral speed of 10 m/s, a bead fill rate of 80 volume %, using zirconia (ZrO$_2$) beads (referred to hereinafter as "Zr beads") 0.5 mm in diameter, in a horizontal bead mill dispersion device.

The abrasive liquid was mixed with the above components. The mixture was then charged to a vertical sand mill dispersion device along with Zr beads 1 mm in diameter and adjusted to a bead volume/(abrasive liquid volume+bead volume) of 60%. The mixture was dispersion processed in the sand mill for 180 minutes. The liquid was removed following processing. A flow-type ultrasonic dispersion filtration device was employed to conduct an ultrasonic dispersion filtration treatment.

The magnetic liquid, silica sol, and abrasive liquid were charged with the other components and solvents added to finish to a dissolver stirrer and mixed for 30 minutes at a peripheral speed of 10 m/s. Subsequently, the mixture was subjected to 20 passes of processing at a flow rate of 7.5 kg/minute in a flow-type ultrasonic dispersing device and filtered five times with a filter having a pore diameter of 0.5 µm to prepare a magnetic layer-forming composition.

A nonmagnetic layer-forming composition was prepared by the following method.

The above components excluding the lubricants (butyl stearate and stearic acid) were kneaded and dilution processed in an open kneader. Subsequently, the mixture was dispersion processed in a horizontal bead mill disperser. Subsequently, the lubricants (butyl stearate and stearic acid) were added and the mixture was stirred and mixed in a dissolver stirrer to prepare a nonmagnetic layer-forming composition.

A backcoat layer-forming composition was prepared by the following method.

The above components excluding the lubricants (butyl stearate and stearic acid), polyisocyanate, and methyl ethyl ketone (400.0 parts) were kneaded and dilution processed in an open kneader. Subsequently, the mixture was dispersed in a horizontal bead mill disperser. Subsequently, the lubricants (butyl stearate and stearic acid), polyisocyanate, and methyl ethyl ketone (400.0 parts) were added and the mixture was stirred and mixed in a dissolver stirrer to prepare a backcoat layer-forming composition.

<Fabrication of Magnetic Tapes>

The backcoat layer-forming composition was coated and dried to a dry thickness of 0.50 µm on one surface of a polyethylene naphthalate support 6.00 µm in thickness to form a coating layer. Subsequently, the support on which the coating layer had been formed was placed in the vibration-imparting device shown in FIG. 1 with the opposite surface from that on which the coating layer had been formed in contact with the vibration-imparting unit. The support (number 1 in FIG. 1) on which the coating layer had been formed was conveyed at a rate of 0.5 m/s and vibration was imparted to the coating layer. In FIG. 1, numeral 2 denotes a guide roller (numeral 2 denotes one of a pair of guide rollers), and number 3 denotes a vibration-imparting device (vibration-imparting unit containing an ultrasonic vibrator). The arrow denotes the direction of conveyance. Table 1 shows the vibration-imparting period as the period from when some location on the support on which the coating layer had been formed came into contact with the vibration-imparting unit until the contact ended. An ultrasonic vibrator was disposed within the vibration-imparting unit employed. Vibration was imparted at the values of the vibration frequency and intensity of the ultrasonic vibrator indicated in Table 1. Subsequently, the nonmagnetic layer-coating composition was coated and dried to a dry thickness of 1.00 µm on the opposite surface of the support on which the backcoat layer had been formed from that on which the backcoat layer had been formed, and irradiated with an electron beam at an energy of 40 kGy and an acceleration voltage of 125 kV. The magnetic layer-coating composition was then coated and dried thereover to a dry thickness of 50 nm.

Subsequently, a surface smoothing treatment (calendering treatment) was conducted with the calender rolls shown in Table 1 at a linear pressure of 300 kg/cm (294 kN/m) at a rate of 80 m/min with a calender comprised solely of metal rolls. The more intense the calender processing conditions were made (such as by raising the surface temperature of the calender rolls), the lower the centerline average surface roughness Ra that was measured on the surface on the magnetic layer side tended to be. Subsequently, a heat treatment was conducted for 36 hours in an environment with an ambient temperature of 70° C. Following the heat treatment, the product was slit to a width of ½ inch (0.0127 meter). The slit product was fed out and the surface on the magnetic layer side was cleaned with a tape cleaning device in which nonwoven fabric and a razor blade were mounted on a device containing a winding device so as to press against the surface on the magnetic layer side. This yielded a magnetic tape.

Examples 2 to 13 and Comparative Examples 1 to 10

With the exceptions that the formulas of the various layer-forming compositions and/or the manufacturing conditions were changed as shown in Table 1, magnetic tapes were fabricated by the same method as in Example 1. The vibration-imparting period was adjusted by changing the conveyance rate of the support on which the coating layer had been formed.

The blending ratio of inorganic powder/carbon black in the backcoat layer given in Table 1 is the content of each powder based on weight relative to 100.0 weight parts of the combined content of inorganic powder and carbon black.

[Method of Evaluating Physical Properties of Magnetic Tape]

<1. Centerline Average Surface Roughness Ra>

An atomic force microscope (AFM, Nanoscope 4 made by Veeco) was employed to measure a measurement area of 40 μm×40 μm and the centerline average surface roughness Ra of the surface on the magnetic layer side of the magnetic tape was obtained. The scan rate (probe displacement rate) was 40 μm/s and the resolution was 512 pixels×512 pixels.

<2. Various Physical Properties Measured by Optical Interferometry>

Two measurement samples were prepared for each Example and Comparative Example. One of these was used as a measurement sample for measuring the full width at half maximum of the spacing distribution $FWHM_{before}$ and $FWHM_{after}$ before and after vacuum heating by optical interferometry on the surface on the backcoat layer side, and the difference ($S2_{after}-S2_{before}$). The other measurement sample was used as a measurement sample for measuring the difference ($S1_{after}-S1_{before}$) by optical interferometry on the surface on the magnetic layer side.

The various physical properties set forth above were measured by the following methods.

(2-1. Measurement on the Surface of the Backcoat Layer Side)

The values of the full width at half maximum of the spacing distribution before and after vacuum heating $FWHM_{before}$ and $FWHM_{after}$ were determined on the surface on the backcoat layer side by the following method using a tape spacing analyzer (TSA) (made by Micro Physics Corp.).

A glass sheet provided on the TSA was disposed on the backcoat layer side surface of the magnetic tape. In this state, a half-sphere made of urethane and provided on the TSA was employed as a pressing member. This half-sphere was pressed with a pressure of $5.05 \times 10^4$ N/m (0.5 atm) against the magnetic layer side surface of the magnetic tape. In this state, white light from a stroboscope provided on the TSA was irradiated through the glass sheet onto a certain area (150,000 μm$^2$ to 200,000 μm$^2$) of the backcoat layer side surface of the magnetic tape. The reflected light obtained was passed through an interference filter (a filter selectively passing light with a wavelength of 633 nm) and received by a charge-coupled device (CCD) to obtain an interference fringe image produced by protrusions and indentation within this area.

The image was divided into 300,000 points and the distance (spacing) from the surface of the glass sheet on the magnetic tape side to the backcoat layer side surface of the magnetic tape was determined for each point. These values were plotted as a histogram, the histogram was fit to a Gaussian distribution, and the full width at half maximum obtained was adopted as the full width at half maximum of the spacing distribution.

Vacuum heating was conducted by storing the magnetic tape for 24 hours in a constant temperature vacuum drier with an internal atmospheric temperature of 70° C. to 90° C. and a degree of vacuum of greater than or equal to 200 Pa but less than or equal to 0.01 MPa.

The most frequent value of the histogram before vacuum heating was subtracted from the most frequent value of the histogram after vacuum heating obtained above to obtain the difference $S2_{after}-S2_{before}$.

(2-2. Measurement on the Surface of the Magnetic Layer Side)

With the exception that the surface to be measured was changed from the surface on the backcoat layer side to the surface on the magnetic layer side, histograms before and after vacuum heating were obtained by the same method as in 2.1 above. The difference ($S1_{after}-S1_{before}$) was calculated by subtracting the most frequent value of the histogram before vacuum heating from the most frequent value of the histogram after vacuum heating that had been obtained in this manner.

[Methods of Evaluating the Performance of the Magnetic Tapes]

<1. Evaluation of the Electromagnetic Characteristics (Signal-to-Noise Ratio (SNR))>

In an environment with an ambient temperature of 23° C.±1° C. and 50% relative humidity, a recording head (metal-in-gap (MIG) head, gap length 0.15 μm, 1.8 T) and a giant magnetoresistive (GMR) head (reproduction track width: 1 μm) were mounted on a loop tester and a signal was recorded at a linear recording density of 325 kfci on each of the magnetic tapes fabricated as set forth above. Subsequently, the reproduction output was tested and the ratio of the reproduction output to the noise was adopted as the SNR. Adopting the SNR of Comparative Example 9 as 0.0 dB, an SNR of greater than or equal to 1.0 dB can be evaluated as affording performance that can meet the stringent needs of future higher density recording.

<2. Evaluation of Scratching of the Surface of the Magnetic Tape>

When scratches are present on the surface of a magnetic tape, the phenomenon whereby the reproduced signal amplitude drops locally in the locations where the scratches are present has been confirmed. Accordingly, the occurrence of scratches on the surface of a magnetic tape (the surface on the magnetic layer side) with repeated running was evaluated based on the frequency of drops in the amplitude of the reproduced signal.

A magnetic recording and reproduction head (referred to as a "head" hereinafter) that had been dismantled from a Linear Tape-Open Generation 6 (LTO (Japanese registered trademark) G6) drive made by IBM Corp. was mounted on a tape running system in an environment of an ambient temperature of 40° C.±1° C. and a relative humidity of 80%. A magnetic tape 20 m in length was fed off a feed roll at a tension of 0.6 N, run at 12 m/s, and wound on a pickup roll. Using this winding method, 10,000 cycles of repeated running were conducted. Following the repeated running, the magnetic tape was run in an LTO G6 drive made by IBM. The recording and reproduction signal output was picked up by an external analog/digital (AD) conversion device and the frequency with which the reproduction signal amplitude dropped by 70% or more of the average (average measurement value over the entire length) was counted. When this frequency was less than or equal to 10 times/meter per tape unit length, the tape can be evaluated as affording performance that would be able to meet the stringent needs of future higher density recording.

<3. Method of Evaluating the Occurrence of Sticking with Repeated Running>

A strain gage was mounted on the head of 2. above and the voltage value obtained during running under the conditions of 2. was monitored. When the load converted from the voltage value exceeded 1.5 N, sticking was determined to have occurred. When the number of occurrences of sticking during 10,000 cycles of running was 1 or fewer, the tape can be evaluated as affording performance that would be able to meet the stringent needs of future higher density recording.

<4. Method of Evaluating the Occurrence of Head Deposits>

With the exception that the tape length was changed to 600 m, the magnetic tape was repeatedly run in a drive under the same conditions as in 2. above. During this repeated running, the head was brought into (sliding) contact with the surface of the magnetic tape. The sliding surface of the head with the magnetic tape was observed under an optical microscope after repeated running. Image processing was then conducted whereby the image obtained was converted to a gray scale and rendered binary, and the area of the black portions was calculated to obtain the area of the black portions. The proportion (area ratio) of the area of the sliding surface of the head with the surface of the magnetic tape in the image of the area of the black portion thus determined was employed as an indicator to evaluate the occurrence of head deposits. The smaller the area ratio calculated, the smaller the deposit on the head that can be determined Head deposits are present between the magnetic tape and the head, causing a drop in running stability. There are also cases in which by increasing the distance between the surface of the magnetic tape and the head, they impart spacing loss and cause a drop in the electromagnetic characteristics. When the area ratio obtained by the above method is less than or equal to 5%, a determination can be made that no or little head deposit had been generated, and the tape can be evaluated as affording performance that would be able to meet the stringent needs of future higher density recording.

The evaluation results are given in Table 1.

TABLE 1

|  |  | Ex. 1 | Ex. 2 | Ex. 3 |
|---|---|---|---|---|
| Magnetic layer-forming composition | Content of butyl stearate | 2.0 parts | 0.5 part | 8.0 parts |
|  | Content of stearic acid | 1.0 part | 1.0 part | 1.0 part |
| Backcoat layer-forming composition | Blending ratio of inorganic powder/ carbon black | 80/20 | 80/20 | 80/20 |
|  | Content of butyl stearate | 0.2 part | 0.1 part | 0.8 part |
|  | Content of stearic acid | 0.1 part | 0.1 part | 0.1 part |
| Manufacturing condition | Calender roll surface temp. | 90° C. | 90° C. | 90° C. |
|  | Vibration-imparting condition | Vibration-imparting period: 0.8 sec. Vibration frequency: 30 kHz Intensity: 100 W | Vibration-imparting period: 0.8 sec. Vibration frequency: 30 kHz Intensity: 100 W | Vibration-imparting period: 0.8 sec. Vibration frequency: 30 kHz Intensity: 100 W |
| Magnetic layer side surface | Centerline average surface roughness Ra | 2.3 nm | 2.3 nm | 2.3 nm |
|  | Difference (S1after − S1before) | 3.0 nm | 0.5 nm | 8.0 nm |
| Backcoat layer side surface | FWHMbefore before vacuum heating | 8.0 nm | 8.0 nm | 8.0 nm |
|  | FWHMafter after vacuum heating | 8.0 nm | 8.0 nm | 8.0 nm |
|  | Difference (S2after − S2before) | 2.0 nm | 1.0 nm | 8.0 nm |
| Results of evaluating physical propertoes | SNR | 2.0 dB | 2.0 dB | 2.0 dB |
|  | Evaluation result of sticking (times) | 0 | 0 | 1 |
|  | Evaluation result of scratching (/m) | 8 | 9 | 6 |
|  | Evaluation result of head deposits (%) | 4 | 5 | 3 |

|  |  | Ex. 4 | Ex. 5 | Ex. 6 |
|---|---|---|---|---|
| Magnetic layer-forming composition | Content of butyl stearate | 0.5 part | 8.0 parts | 2.0 parts |
|  | Content of stearic acid | 1.0 part | 1.0 part | 1.0 part |
| Backcoat layer-forming composition | Blending ratio of inorganic powder/ carbon black | 80/20 | 80/20 | 80/20 |
|  | Content of butyl stearate | 0.1 part | 0.8 part | 0.2 part |
|  | Content of stearic acid | 0.1 part | 0.1 part | 0.1 part |
| Manufacturing condition | Calender roll surface temp. | 110° C. | 110° C. | 90° C. |
|  | Vibration-imparting condition | Vibration-imparting period: 0.8 sec. Vibration frequency: 30 kHz Intensity: 100 W | Vibration-imparting period: 0.8 sec. Vibration frequency: 30 kHz Intensity: 100 W | Vibration-imparting period: 2.0 sec. Vibration frequency: 30 kHz Intensity: 100 W |
| Magnetic layer side surface | Centerline average surface roughness Ra | 1.8 nm | 1.8 nm | 2.3 nm |
|  | Difference (S1after − S1before) | 0.5 nm | 8.0 nm | 3.0 nm |
| Backcoat layer side surface | FWHMbefore before vacuum heating | 8.0 nm | 8.0 nm | 2.0 nm |
|  | FWHMafter after vacuum heating | 8.0 nm | 8.0 nm | 8.0 nm |
|  | Difference (S2after − S2before) | 1.0 nm | 8.0 nm | 2.0 nm |

TABLE 1-continued

|  |  |  |  |  |
|---|---|---|---|---|
| Results of evaluating physical propertoes | SNR | 2.5 dB | 2.5 dB | 2.0 dB |
|  | Evaluation result of sticking (times) | 1 | 1 | 0 |
|  | Evaluation result of scratching (/m) | 10 | 10 | 5 |
|  | Evaluation result of head deposits (%) | 4 | 4 | 1 |

|  |  | Ex. 7 | Ex. 8 | Ex. 9 |
|---|---|---|---|---|
| Magnetic layer-forming composition | Content of butyl stearate | 2.0 parts | 2.0 parts | 2.0 parts |
|  | Content of stearic acid | 1.0 part | 1.0 part | 1.0 part |
| Backcoat layer-forming composition | Blending ratio of inorganic powder/carbon black | 80/20 | 100/0 | 80/20 |
|  | Content of butyl stearate | 0.2 part | 0.2 part | 0.2 part |
|  | Content of stearic acid | 0.1 part | 0.1 part | 0.1 part |
| Manufacturing condition | Calender roll surface temp. | 110° C. | 90° C. | 85° C. |
|  | Vibration-imparting condition | Vibration-imparting period: 2.0 sec. Vibration frequency: 30 kHz Intensity: 100 W | Vibration-imparting period: 0.8 sec. Vibration frequency: 30 kHz Intensity: 100 W | Vibration-imparting period: 0.8 sec. Vibration frequency: 30 kHz Intensity: 100 W |
| Magnetic layer side surface | Centerline average surface roughness Ra | 1.8 nm | 2.3 nm | 2.7 nm |
|  | Difference (S1after − S1before) | 3.0 nm | 3.0 nm | 3.0 nm |
| Backcoat layer side surface | FWHMbefore before vacuum heating | 2.0 nm | 8.0 nm | 8.0 nm |
|  | FWHMafter after vacuum heating | 8.0 nm | 2.0 nm | 8.0 nm |
|  | Difference (S2after − S2before) | 8.0 nm | 2.0 nm | 2.0 nm |
| Results of evaluating physical propertoes | SNR | 2.5 dB | 2.0 dB | 1.0 dB |
|  | Evaluation result of sticking (times) | 1 | 0 | 0 |
|  | Evaluation result of scratching (/m) | 10 | 8 | 5 |
|  | Evaluation result of head deposits (%) | 2 | 3 | 2 |

|  |  | Ex. 10 | Ex. 11 | Ex. 12 | Ex. 13 |
|---|---|---|---|---|---|
| Magnetic layer-forming composition | Content of butyl stearate | 2.0 parts | 2.0 part | 2.0 parts | 2.0 parts |
|  | Content of stearic acid | 2.0 parts | 0.5 part | 1.0 part | 1.0 part |
| Backcoat layer-forming composition | Blending ratio of inorganic powder/carbon black | 80/20 | 80/20 | 80/20 | 80/20 |
|  | Content of butyl stearate | 0.2 part | 0.2 part | 0.2 part | 0.2 part |
|  | Content of stearic acid | 0.1 part | 0.1 part | 0.2 part | 0.05 part |
| Manufacturing condition | Calender roll surface temp. | 90° C. | 90° C. | 90° C. | 90° C. |
|  | Vibration-imparting condition | Vibration-imparting period: 0.8 sec. Vibration frequency: 30 kHz Intensity: 100 W | Vibration-imparting period: 0.8 sec. Vibration frequency: 30 kHz Intensity: 100 W | Vibration-imparting period: 0.8 sec. Vibration frequency: 30 kHz Intensity: 100 W | Vibration-imparting period: 0.8 sec. Vibration frequency: 30 kHz Intensity: 100 W |
| Magnetic layer side surface | Centerline average surface roughness Ra | 2.3 nm | 2.3 nm | 2.3 nm | 2.3 nm |
|  | Difference (S1after − S1before) | 3.0 nm | 3.0 nm | 3.0 nm | 3.0 nm |
| Backcoat layer side surface | FWHMbefore before vacuum heating | 8.0 nm | 8.0 nm | 8.0 nm | 8.0 nm |
|  | FWHMafter after vacuum heating | 8.0 nm | 8.0 nm | 8.0 nm | 8.0 nm |
|  | Difference (S2after − S2before) | 2.0 nm | 2.0 nm | 2.0 nm | 2.0 nm |
| Results of evaluating physical propertoes | SNR | 2.0 dB | 2.0 dB | 2.0 dB | 2.0 dB |
|  | Evaluation result of sticking (times) | 0 | 0 | 0 | 0 |
|  | Evaluation result of scratching (/m) | 8 | 8 | 8 | 8 |
|  | Evaluation result of head deposits (%) | 4 | 4 | 4 | 4 |

|  |  | Comp. Ex. 1 | Comp. Ex. 2 | Comp. Ex. 3 |
|---|---|---|---|---|
| Magnetic layer-forming composition | Content of butyl stearate | 2.0 parts | 8.0 parts | 10.0 parts |
|  | Content of stearic acid | 1.0 part | 1.0 part | 1.0 part |

TABLE 1-continued

| | | | | |
|---|---|---|---|---|
| Backcoat layer-forming composition | Blending ratio of inorganic powder/carbon black | 80/20 | 80/20 | 80/20 |
| | Content of butyl stearate | 0.2 part | 0.2 part | 0.2 part |
| | Content of stearic acid | 0.1 part | 0.1 part | 0.1 part |
| Manufacturing condition | Calender roll surface temp. | 90° C. | 90° C. | 90° C. |
| | Vibration-imparting condition | Not conducted | Not conducted | Vibration-imparting period: 0.8 sec. Vibration frequency: 30 kHz Intensity: 100 W |
| Magnetic layer side surface | Centerline average surface roughness Ra | 2.3 nm | 2.3 nm | 2.3 nm |
| | Difference (S1after − S1before) | 3.0 nm | 8.0 nm | 11.0 nm |
| Backcoat layer side surface | FWHMbefore before vacuum heating | 13.0 nm | 13.0 nm | 8.0 nm |
| | FWHMafter after vacuum heating | 8.0 nm | 8.0 nm | 8.0 nm |
| | Difference (S2after − S2before) | 2.0 nm | 2.0 nm | 2.0 nm |
| Results of evaluating physical propertoes | SNR | 2.0 dB | 2.0 dB | 2.0 dB |
| | Evaluation result of sticking (times) | 0 | 1 | 5 |
| | Evaluation result of scratching (/m) | 8 | 5 | 7 |
| | Evaluation result of head deposits (%) | 16 | 7 | 10 |

| | | Comp. Ex. 4 | Comp. Ex. 5 | Comp. Ex. 6 |
|---|---|---|---|---|
| Magnetic layer-forming composition | Content of butyl stearate | 2.0 parts | 2.0 parts | 0.5 part |
| | Content of stearic acid | 1.0 part | 1.0 part | 1.0 part |
| Backcoat layer-forming composition | Blending ratio of inorganic powder/carbon black | 80/20 | 80/20 | 80/20 |
| | Content of butyl stearate | 0.8 part | 1.2 part | 0.2 part |
| | Content of stearic acid | 0.1 part | 0.1 part | 0.1 part |
| Manufacturing condition | Calender roll surface temp. | 90° C. | 90° C. | 90° C. |
| | Vibration-imparting condition | Not conducted | Vibration-imparting period: 0.8 sec. Vibration frequency: 30 kHz Intensity: 100 W | Not conducted |
| Magnetic layer side surface | Centerline average surface roughness Ra | 2.3 nm | 2.3 nm | 2.3 nm |
| | Difference (S1after − S1before) | 3.0 nm | 3.0 nm | 0.5 nm |
| Backcoat layer side surface | FWHMbefore before vacuum heating | 13.0 nm | 8.0 nm | 13.0 nm |
| | FWHMafter after vacuum heating | 8.0 nm | 8.0 nm | 8.0 nm |
| | Difference (S2after − S2before) | 8.0 nm | 12.0 nm | 2.0 nm |
| Results of evaluating physical propertoes | SNR | 2.0 dB | 2.0 dB | 2.0 dB |
| | Evaluation result of sticking (times) | 3 | 6 | 1 |
| | Evaluation result of scratching (/m) | 7 | 9 | 10 |
| | Evaluation result of head deposits (%) | 7 | 11 | 20 |

| | | Comp. Ex. 7 | Comp. Ex. 8 | Comp. Ex. 9 | Comp. Ex. 10 |
|---|---|---|---|---|---|
| Magnetic layer-forming composition | Content of butyl stearate | 2.0 part | 2.0 part | 2.0 parts | 2.0 parts |
| | Content of stearic acid | 1.0 part | 1.0 part | 1.0 part | 1.0 part |
| Backcoat layer-forming composition | Blending ratio of inorganic powder/carbon black | 80/20 | 80/20 | 80/20 | 0/100 |
| | Content of butyl stearate | 0.1 part | 0.0 part | 0.2 part | 0.2 part |
| | Content of stearic acid | 0.1 part | 0.1 part | 0.1 part | 0.1 part |
| Manufacturing condition | Calender roll surface temp. | 90° C. | 90° C. | 80° C. | 90° C. |
| | Vibration-imparting condition | なし | なし | Vibration-imparting period: 0.8 sec. Vibration frequency: 30 kHz Intensity: 100 W | Vibration-imparting period: 0.8 sec. Vibration frequency: 30 kHz Intensity: 100 W |
| Magneic layer side surface | Centerline average surface roughness Ra | 2.3 nm | 2.3 nm | 2.9 nm | 2.3 nm |
| | Difference (S1after − S1before) | 3.0 nm | 3.0 nm | 3.0 nm | 3.0 nm |

TABLE 1-continued

| | | | | | |
|---|---|---|---|---|---|
| Backcoat layer side surface | FWHMbefore before vacuum heating | 13.0 nm | 8.0 nm | 8.0 nm | 8.0 nm |
| | FWHMafter after vacuum heating | 8.0 nm | 8.0 nm | 8.0 nm | 12.0 nm |
| | Difference (S2after − S2before) | 1.0 nm | 0.0 nm | 2.0 nm | 2.0 nm |
| Results of evaluating physical propertoes | SNR | 2.0 dB | 2.0 dB | 0.0 dB | 2.0 dB |
| | Evaluation result of sticking (times) | 1 | 1 | 0 | 0 |
| | Evaluation result of scratching (/m) | 8 | 10 | 5 | 8 |
| | Evaluation result of head deposits (%) | 18 | 24 | 5 | 14 |

Based on the results in Table 1, the magnetic tapes of Examples can be determined to exhibit good electromagnetic characteristics (high SNR), and to inhibit the occurrence of sticking of the head and the surface of the magnetic tape, scratching of the surface of the magnetic tape, and the generation of head deposits with repeated running.

An aspect of the present invention can be useful in the technical field of magnetic tapes for high-density recording, such as data backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a magnetic layer comprising ferromagnetic powder and binder on one surface of a nonmagnetic support and a backcoat layer comprising nonmagnetic powder and binder on the other surface of the nonmagnetic support, wherein:
a centerline average surface roughness Ra measured on a surface on the magnetic layer side of the magnetic tape is less than or equal to 2.8 nm;
the magnetic layer comprises a fatty acid ester;
a difference, $S1_{after}-S1_{before}$, between a spacing $S1_{after}$ measured by optical interferometry on the surface on the magnetic layer side of the magnetic tape after vacuum heating the magnetic tape and a spacing $S1_{before}$ measured by optical interferometry on the surface on the magnetic layer side of the magnetic tape before vacuum heating the magnetic tape is greater than 0 nm but less than or equal to 8.0 nm;
the backcoat layer comprises a fatty acid ester;
a full width at half maximum of a spacing distribution measured by optical interferometry on a surface on the backcoat layer side of the magnetic tape before vacuum heating the magnetic tape is greater than 0 nm but less than or equal to 10.0 nm;
a full width at half maximum of a spacing distribution measured by optical interferometry on the surface on the backcoat layer side of the magnetic tape after vacuum heating the magnetic tape is greater than 0 nm but less than or equal to 10.0 nm; and
a difference, $S2_{after}-S2_{before}$, between a spacing $S2_{after}$ measured by optical interferometry on the surface on the backcoat layer side of the magnetic tape after vacuum heating the magnetic tape and a spacing $S2_{before}$ measured by optical interferometry on the surface on the backcoat layer side of the magnetic tape before vacuum heating the magnetic tape is greater than 0 nm but less than or equal to 8.0 nm.

2. The magnetic tape according to claim 1,
wherein the centerline average surface roughness Ra measured on the surface on the magnetic layer side of the magnetic tape is less than or equal to 2.5 nm.

3. The magnetic tape according to claim 1,
wherein the nonmagnetic powder that is contained in the backcoat layer is one or more types of nonmagnetic powder selected from the group consisting of inorganic powder and carbon black.

4. The magnetic tape according to claim 3,
wherein the proportion accounted for by the inorganic powder falls within a range of greater than 50 weight parts to 100 weight parts per 100 weight parts of the total quantity of the nonmagnetic powder contained in the backcoat layer.

5. The magnetic tape according to claim 1,
wherein the full width at half maximum of the spacing distribution measured by optical interferometry on the surface on the backcoat layer side of the magnetic tape before vacuum heating the magnetic tape is greater than 0 nm but less than or equal to 5.0 nm.

6. The magnetic tape according to claim 1,
wherein the full width at half maximum of the spacing distribution measured by optical interferometry on the surface on the backcoat layer side of the magnetic tape after vacuum heating the magnetic tape is greater than 0 nm but less than or equal to 5.0 nm.

7. The magnetic tape according to claim 1,
wherein the difference, $S2_{after}-S2_{before}$, falls within a range of 0.5 nm to 6.0 nm.

8. The magnetic tape according to claim 1,
wherein the difference, $S1_{after}-S1_{after}$, falls within a range of 0.5 nm to 5.0 nm.

9. A method of manufacturing a magnetic tape,
wherein the magnetic tape is a magnetic tape, which comprises a magnetic layer comprising ferromagnetic powder and binder on one surface of a nonmagnetic support and a backcoat layer comprising nonmagnetic powder and binder on the other surface of the nonmagnetic support, wherein:
a centerline average surface roughness Ra measured on a surface on the magnetic layer side of the magnetic tape is less than or equal to 2.8 nm;
the magnetic layer comprises a fatty acid ester;
a difference, $S1_{after}-S1_{before}$, between a spacing $S1_{after}$ measured by optical interferometry on the surface on the magnetic layer side of the magnetic tape after vacuum heating the magnetic tape and a spacing $S1_{before}$ measured by optical interferometry on the surface on the magnetic layer side of the magnetic tape before vacuum heating the magnetic tape is greater than 0 nm but less than or equal to 8.0 nm;
the backcoat layer comprises a fatty acid ester;
a full width at half maximum of a spacing distribution measured by optical interferometry on a surface on the backcoat layer side of the magnetic tape before vacuum heating the magnetic tape is greater than 0 nm but less than or equal to 10.0 nm;
a full width at half maximum of a spacing distribution measured by optical interferometry on the surface on the backcoat layer side of the magnetic tape after vacuum heating the magnetic tape is greater than 0 nm but less than or equal to 10.0 nm; and
a difference, $S2_{after}-S2_{before}$, between a spacing $S2_{after}$ measured by optical interferometry on the surface on the backcoat layer side of the magnetic tape after vacuum heating the magnetic tape and a spacing $S2_{before}$ measured by optical interferometry on the surface on the backcoat layer side of the magnetic tape before vacuum heating the magnetic tape is greater than 0 nm but less than or equal to 8.0 nm; and
the method comprises:
coating and drying a backcoat layer-forming composition comprising nonmagnetic powder, binder, and a fatty acid ester on one surface of a nonmagnetic support to form a coating layer; and
applying vibration to the coating layer that has been formed to form a backcoat layer.

10. The method of manufacturing a magnetic tape according to claim 9,
wherein the vibration is ultrasonic vibration.

11. The method of manufacturing a magnetic tape according to claim 9,
wherein, in the magnetic tape, the centerline average surface roughness Ra measured on the surface on the magnetic layer side of the magnetic tape is less than or equal to 2.5 nm.

12. The method of manufacturing a magnetic tape according to claim 9,
wherein, in the magnetic tape, the nonmagnetic powder that is contained in the backcoat layer is one or more types of nonmagnetic powder selected from the group consisting of inorganic powder and carbon black.

13. The method of manufacturing a magnetic tape according to claim 12,
wherein, in the magnetic tape, the proportion accounted for by the inorganic powder falls within a range of greater than 50 weight parts to 100 weight parts per 100 weight parts of the total quantity of the nonmagnetic powder contained in the backcoat layer.

14. The method of manufacturing a magnetic tape according to claim 9,
wherein, in the magnetic tape, the full width at half maximum of the spacing distribution measured by optical interferometry on the surface on the backcoat layer side of the magnetic tape before vacuum heating the magnetic tape is greater than 0 nm but less than or equal to 5.0 nm.

15. The method of manufacturing a magnetic tape according to claim 9,
wherein, in the magnetic tape, the full width at half maximum of the spacing distribution measured by optical interferometry on the surface on the backcoat layer side of the magnetic tape after vacuum heating the magnetic tape is greater than 0 nm but less than or equal to 5.0 nm.

16. The method of manufacturing a magnetic tape according to claim 9,
wherein, in the magnetic tape, the difference, $S2_{after}-S2_{before}$, falls within a range of 0.5 nm to 6.0 nm.

17. The method of manufacturing a magnetic tape according to claim 9,
wherein, in the magnetic tape, the difference, $S1_{after}-S1_{after}$, falls within a range of 0.5 nm to 5.0 nm.

* * * * *